US005690774A

United States Patent [19]

Greene

[11] Patent Number: 5,690,774

[45] Date of Patent: Nov. 25, 1997

[54] APPARATUS AND METHOD FOR MAINTAINING THE CONFIDENTIALITY OF PRINTED INFORMATION

[75] Inventor: Morton Greene, Arlington, Va.

[73] Assignee: Gordian Holding Corporation, Tysons Corner, Va.

[21] Appl. No.: 494,124

[22] Filed: Jun. 5, 1995

Related U.S. Application Data

[63] Continuation of Ser. No. 244,921, filed as PCT/US92/11155, Dec. 21, 1992 published as WO93/11948, Jun. 24, 1993, abandoned, which is a continuation-in-part of Ser. No. 810,289, Dec. 19, 1991, Pat. No. 5,195,903.

[51] Int. Cl.[6] .......... B32B 35/00

[52] U.S. Cl. .......... 156/269; 156/277; 156/301; 156/384; 156/552; 283/94; 493/188; 493/197; 493/202; 493/208; 493/254

[58] Field of Search .......... 156/204, 217, 156/269, 277, 301, 384, 552; 283/94; 493/188, 197, 199, 202, 208, 210, 243, 249, 254, 264

[56] References Cited

U.S. PATENT DOCUMENTS

| | | | |
|---|---|---|---|
| 1,944,794 | 1/1934 | Klinger | 93/63 |
| 3,438,310 | 4/1969 | Woodruff et al. | 93/63 |
| 3,628,304 | 12/1971 | Hornung | 53/460 |
| 3,830,141 | 8/1974 | Steidinger | 53/450 |
| 4,031,818 | 6/1977 | Kehoe | 493/1 |
| 4,067,171 | 1/1978 | Herbert et al. | 53/429 |
| 4,071,997 | 2/1978 | Gunther, Jr. et al. | 53/429 |
| 4,522,382 | 6/1985 | Chu et al. | 270/1.02 |
| 4,627,829 | 12/1986 | Brady, Jr. et al. | 156/216 X |
| 4,826,475 | 5/1989 | Eweryd | 493/10 |
| 4,839,732 | 6/1989 | Murakami et al. | 358/304 |
| 4,898,323 | 2/1990 | Chen et al. | 229/92.3 |
| 4,912,761 | 3/1990 | Tan et al. | 380/18 |
| 4,951,863 | 8/1990 | Templet | 229/72 |
| 5,085,469 | 2/1992 | Castro | 283/94 |
| 5,123,892 | 6/1992 | Lin | 156/218 X |
| 5,255,106 | 10/1993 | Castro | 358/400 |

FOREIGN PATENT DOCUMENTS

| | | | |
|---|---|---|---|
| 0297843 | 1/1989 | European Pat. Off. | B31B 41/00 |
| 2327388 | 1/1975 | Germany . | |
| 836003 | 6/1960 | United Kingdom . | |

*Primary Examiner*—Mark A. Osele

*Attorney, Agent, or Firm*—Reed Smith Shaw & McClay LLP

[57] ABSTRACT

An apparatus and method for maintaining the confidentiality of information contained in a printed document is accomplished by enclosing the document in an envelope, or similar enclosure, before the document is discharged from the apparatus. The apparatus generally includes: a printer, which may be a facsimile machine, photocopier, or computer printer; a document positioner for positioning the document, so that the document may be enclosed in an envelope; and a document encloser, which encloses the document in the envelope so that the document may later be removed from the envelope for viewing only by the intended recipient. The functions and sequencing of the apparatus are controlled by a suitable control system. A label printer, for printing the name of the intended recipient on the envelope, or the other desired information, may also be included.

17 Claims, 15 Drawing Sheets

FIG. 9D
| REF. DES. | PART NO. |
|---|---|
| K1, K3, K5 | CRYDOM TD1210 |
| K2, K4 | CRYDOM D1D07 |
| K6, K7, KØ | MIDTEX 258-62T200 |
| U1 | OMEGA ENG. CN351-JF3 |
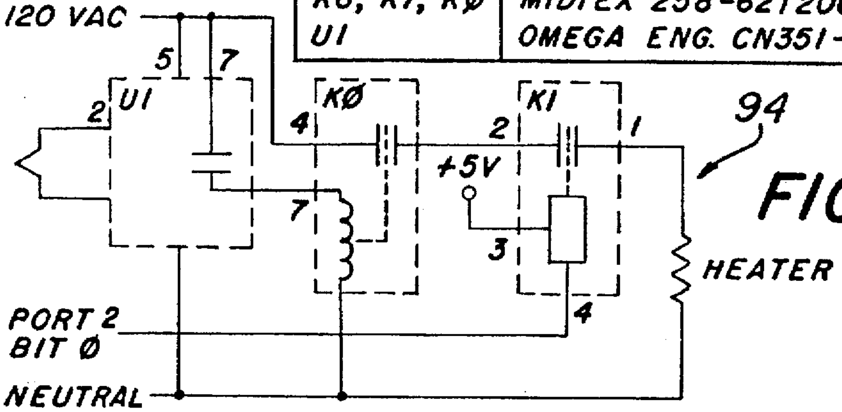
FIG. 9A
FIG. 9B
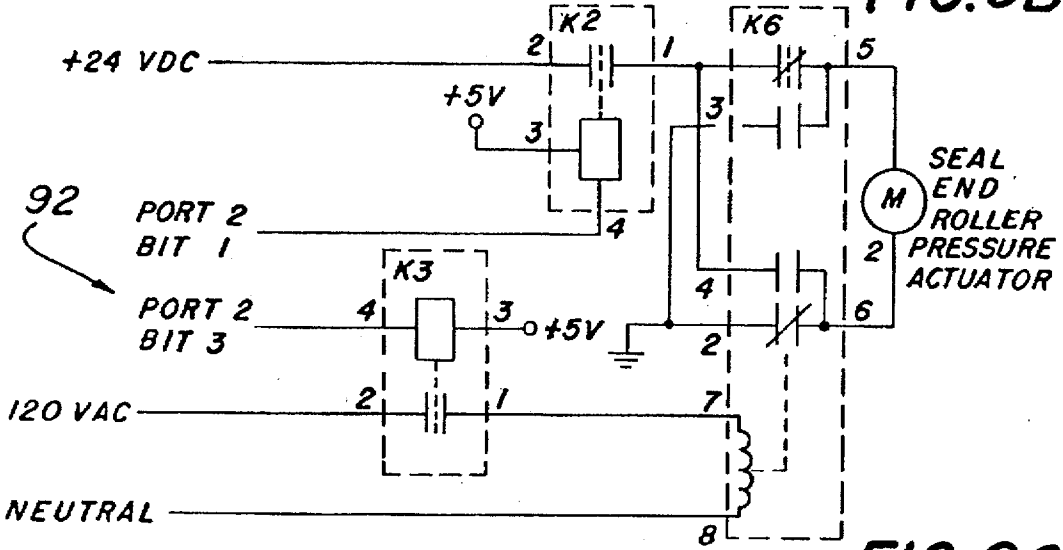
FIG. 9C
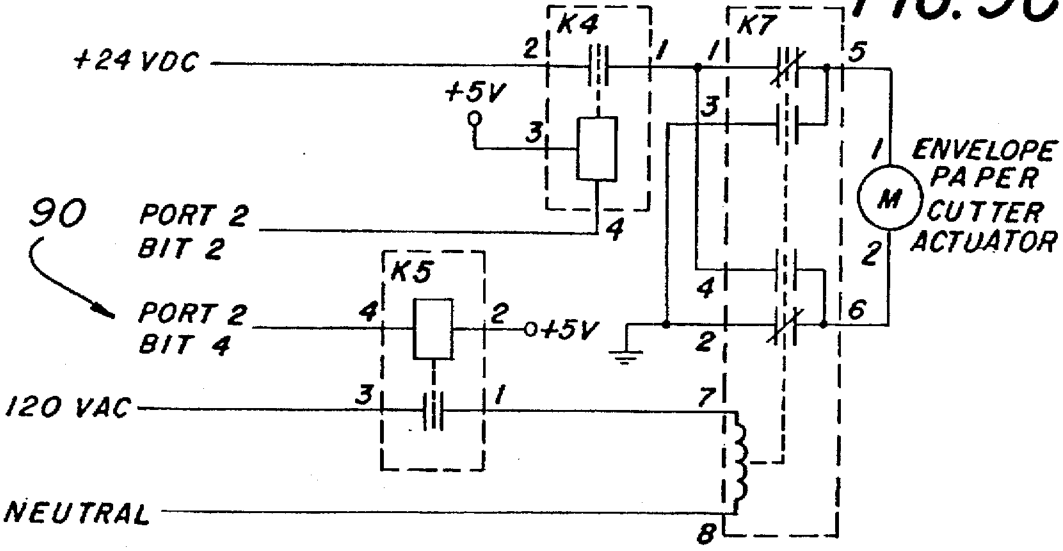

APPARATUS AND METHOD FOR MAINTAINING THE CONFIDENTIALITY OF PRINTED INFORMATION

CROSS REFERENCE TO RELATED APPLICATION

This is a continuation of application Ser. No. 08/244,921 filed on Jun. 15, 1994 now abandoned and International Application PCT/US92/11155 filed on Dec. 21, 1992 and which designated the U.S., which is a continuation-in-part of prior U.S. application Ser. No. 07/810,289, filed Dec. 19, 1991 now U.S. Pat. No. 5,195,903.

BACKGROUND OF THE INVENTION

This invention relates to maintaining the confidentiality of information, and more particularly to an apparatus, method and product produced by such method for ensuring the maintenance of the confidentiality of printed information for the particular purposes described below.

With the advent of the automated office, maintaining the confidentiality of the content of printed matter, such as the content of correspondence, contracts, financial data, and the like, has become increasingly difficult. Because of the ease with which identical copies of such documents can be made with various equipment, such as facsimile machines, photocopiers and computer printers, the need has arisen for a means for reducing the risk that confidential information contained in such documents will be accidentally or intentionally read by unauthorized personnel before such documents reach the intended recipient.

One attempt to resolve this problem, at least from the standpoint of maintaining the confidentiality of documents printed on a facsimile machine, is disclosed in U.S. Pat. No. 4,912,761. The apparatus and method described therein is designed to deter the "casual" reader, interposed between the receiver of the transmission, and the intended recipient, from reading the document. Specifically, the document is divided into two separate documents which are individually unreadable in an easy and straight forward manner. The two separate documents are transmitted in sequence. The portions are then reconstituted at the receiving end by the intended recipient by using a transparency overlay process with the two portions. The patterning at the transmitting end may be accomplished by an optical filtering process or alternatively may be computer generated manipulating a pre-input document to produce the two portions for printing and transmission.

This system is, however, intended to deter only the "casual" reader as the separate documents are only unreadable in an "easy and straight forward manner." Moreover, the system requires scrambling and unscrambling of the original document. As this system only deters the "casual" reader, the need still exists for an apparatus and method which maintains the document in its original form while deterring unauthorized persons from viewing the document from the time it is received at the location of the intended recipient to the time it actually reaches the intended recipient. There also exists a need for an apparatus and method which is adaptable to various office equipment such as photocopiers and printers.

SUMMARY OF THE INVENTION

In accordance with this invention, confidentiality of printed information contained in a document may be maintained by inserting, enclosing or constructing around the document an envelope or like enclosure and sealing the document in the envelope after the document has been printed. Alternatively, the printed information may be covered by any suitable opaque covering, such as paper, after printing.

In the case of facsimile machines, this invention provides for the maintenance of confidentiality of printed matter contained in a facsimile from the time the document is transmitted from the sender until the intended receiver removes the document from the envelope or other enclosure or covering The terms "envelope", "package", "covering", "cover", "enclosure" or similar term as used herein, and in the claims which follow, are used interchangeably to mean "that which obscures the information contained in the document from view."

In the case of photocopiers, printers and similar machines, the invention provides means by which the confidentiality of a printed document may be maintained from the time it is printed or copied until the intended receiver removes the document from the envelope or other enclosure or removes the opaque covering.

With the foregoing in mind, the present invention provides, in general, an apparatus and method for maintaining the confidentiality of information contained in a printed document. Preferably, confidentiality is maintained by sealing the document in an envelope or other suitable covering or package such that the intended receiver of the document may remove the document from the envelope or package without damaging the document.

The printed document may be from any source but generally is produced by standard paper handling equipment as well as office equipment such as facsimile machines, photocopiers, computer printers, and the like.

The apparatus generally comprises a document confidentiality maintenance device and a controller or control system which automatically controls the functions and sequencing of the document positioner, the document encloser, and the printing device. The confidentiality maintenance device comprises: any form of document printer (e.g. facsimile machine, photocopier, computer printer and the like); a document positioner, which positions the document such that it can be enclosed in an envelope; and a document encloser which encloses the document in the envelope so that the document may be removed from the envelope by the intended receiver. Preferably, the document may be removed from the envelope without damage to the document itself. Furthermore, the envelope may include a means for detecting tampering with the seals of the envelope such as by embossing the seals with a pattern which would indicate to the intended recipient that the seal has been partially or completely broken.

The method of the invention generally comprises the steps of printing the document, positioning the document, enclosing the document in the envelope and controlling the printing, positioning and enclosing steps.

The invention may also handle documents and envelopes fabricated from various types of material. Such materials include fiber based envelope materials such as DOW CHEMICAL's "TYVEK", and various types of paper including, but not limited to, conventional computer-type paper such as continuous form feed computer paper with detachable clean edge margins, nonmargin continuous roll paper, unmargined single sheets of paper, thermal reactive paper (such as the type commonly employed in facsimile machines), and the like. Choice of envelope material is not critical, however, it is a consideration when choosing a means for handling and transporting the material.

Various methods of sealing the envelope are suitable for this invention. Although any means to affix paper or other fibrous material together may be employed in practicing this invention, adhesives are preferred. Specifically, heat sensitive and pressure sensitive adhesives are preferred. One such heat sensitive adhesive is available from Imperial Adhesive Corp. of Cincinnati, Ohio, under the trade name "VITEX". VITEX employs a heat activated polymer which is activated between about 160° F. and about 180° F. By changing the polymer solution of VITEX, the polymer may be produced to activate at temperatures as low as about 140° F. Imperial Adhesive Corp. also produces a water soluble latex adhesive which is activated by applying pressure. Either of these adhesives may be employed by the several embodiments described herein. Regardless of the particular adhesive chosen, adhesive may be applied to the envelope material prior to inserting the material into the apparatus or during the operation of the apparatus.

Optionally, various embodiments of the apparatus may also include any combination of the following components which carry out particular functions of the invention: a document printer, an envelope label printer, paper and envelope supply devices, document and envelope paper separation devices, uni- and bi-directional motorized tractor feeds or C- or similar shaped channels, which transport and guide the document and envelope material, form feed paper margin separation systems, and/or an envelope sealing system.

In several embodiments, the envelope is fabricated from one or more webs of envelope material. In the case of more than one web of envelope material, the printed document is positioned between or otherwise enveloped by the webs. In the case of a single web, the web is formed into a cup, a U- or V-shape. The bottom edge or vertex of the cupped, U- or V-shaped web is folded to form the envelope. The three open sides are sealed to complete the enclosing step in forming the envelope. In the case of two envelope webs, the document is positioned between the webs. The four edges of the envelope are then sealed.

In all cases (single or multiple webs), the envelope is sealed in such a manner that the document may be removed from the envelope by the intended recipient without damage to the document itself. Moreover, the envelope may be fabricated in such a manner that it cannot be opened without destroying the envelope itself such as by embossing or knurling the envelope along the seals. This added feature assures the intended recipient that the confidentiality of the contents of the document has been maintained.

Another aspect of this invention provides for affixation of the name and/or address, or any other information which may be desired, to the outside of the envelope so that the document reaches the intended recipient without the need for opening the envelope or otherwise viewing the document. This is another feature of the invention which assures maintenance of the integrity and confidentiality of the document.

In accordance with another aspect of this invention, a method for ensuring maintenance of the confidentiality of information contained in a printed document is provided. The method comprises the steps of printing the document, positioning the document such that the document may be enclosed in an envelope, enclosing the document in the envelope such that the document may later be removed from the envelope, and controlling the printing positioning and enclosing steps.

In yet another aspect of this invention, a product, produced by the method of the invention described herein is provided. The product comprises the printed document which has been automatically positioned and enclosed in an envelope. The envelope may, optionally include an address indicating the intended recipient as well as embossing or knurling at the seal points of the envelope as a means of detecting tampering with the envelope.

Another aspect of this invention is to provide an apparatus and method for maintaining the confidentiality of printed matter which optionally has the capability of fabricating an envelope after the print data has been received by the printer but before the document has been printed. This "real time" fabrication feature enables the machine to determine the physical length of the longest page to be printed (to accommodate for example 8½"×11" or 8½"×14" document sheets) and to construct an envelope of appropriate length. The invention provides for any length paper desired.

Still another aspect of this invention provides for an apparatus and method for securing the confidentiality of documents while the documents are contained in the document confidentiality maintenance device. For example, this feature may be provided for by enclosing the entire device in an opaque shrouding or cabinet. Should the shrouding or cabinet be partially or completely removed, the operation of the controller and document confidentiality nature device is inhibited. Accordingly, the device will not operate if the shrouding or cabinetry is partially or completely removed.

Further features, objects and advantages of the invention will become apparent to those skilled in the art upon consideration of the detailed explanation of the specific embodiments of this invention to be given hereafter with reference to the attached drawings.

BRIEF DESCRIPTION OF THE DRAWINGS

FIG. 9A is a wiring diagram of the heater control circuit of FIG. 8.

FIG. 9B is a wiring diagram of the seal pressure motor control circuit of FIG. 8.

FIG. 9C is a wiring diagram of the envelope paper cutter motor control circuit of FIG. 8.

FIG. 9D is a chart depicting the make and model numbers of particular elements referenced in FIGS. 9A through 9C.

DETAILED DESCRIPTION OF THE PREFERRED EMBODIMENT

Figure 1:
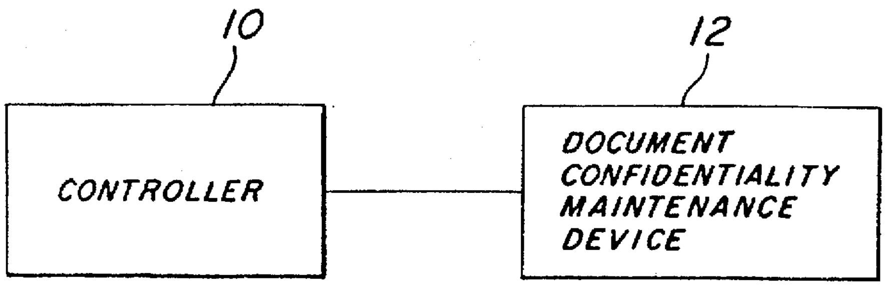
FIG. 1 is a schematic representation of the elements which comprise the apparatus of this invention.

Referring now to the drawings in detail, wherein like elements are indicated by like reference numerals, there is seen in FIG. 1 the elements which comprise the apparatus of this invention namely the controller or control system, designated generally by reference numeral 10, and the document confidentiality maintenance device (CMD), designated generally by reference numeral 12.

Figure 2:
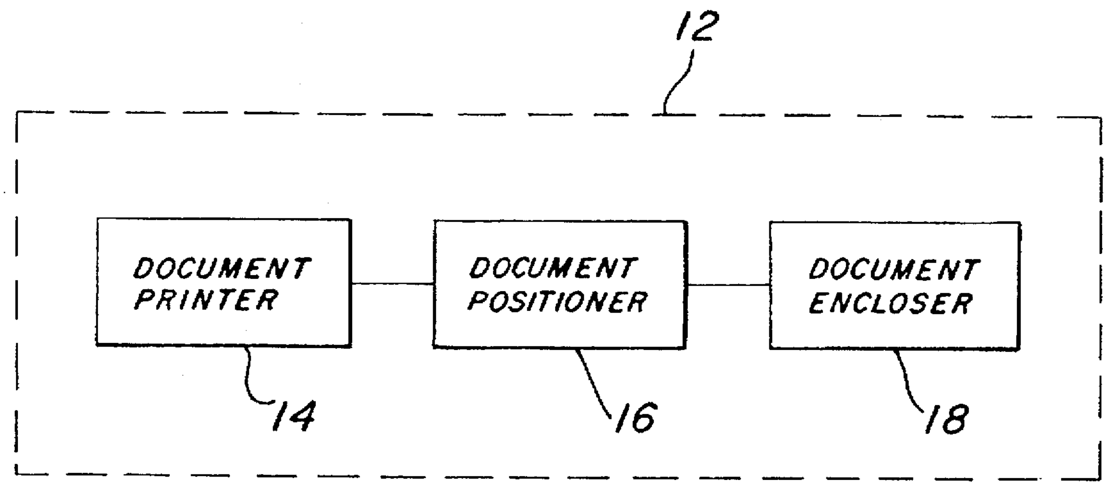
FIG. 2 is a schematic representation of the elements which comprise the document confidentiality maintenance device of FIG. 1.

FIG. 2 illustrates, in schematic form, the elements comprising CMD 12. CMD 12 comprises document printer 14, document positioner 16 and a document encloser 18. Document printer 14 may be any printing device suitable for printing a document such as facsimile machines, photocopiers, computer printers and the like.

Document positioner 16 positions the printed document such that the document may be enclosed in an enclosure suitable for maintaining the confidentiality of the printed document. Positioner 16 may employ any means for assuring proper positioning. In several embodiments described herein, the document is positioned between separate sheets of envelope material or a single U- or V-shaped web of envelope material. Positioner 16 may employ any suitable material handling equipment. Such equipment may comprise any or a combination of any of the following devices: conveyor mechanisms; gravity feed mechanisms; tractor feed conveyors, where computer type paper having perforated holes at the margins is utilized; guiding mechanisms, such as C-shaped channels located on either longitudinal side of the document sheet which guide the longitudinal sides of the document to desired positions (via driven rollers, comealongs or the like); and/or any other material handling devices known in the art.

Document encloser 18 encloses the printed document in an enclosure suitable to maintain the confidentiality of the printed contents. The enclosure may be constructed from any opaque material to form a covering which obscures from view the printed contents of the document. The enclosure is preferably in the form of an envelope-like enclosure which is preferably fabricated by a device in which the envelope is fabricated around the document prior to the document's discharge from the apparatus of this invention. Other embodiments of the invention may utilize envelopes which are fabricated by the apparatus of this invention, or by other means, wherein document encloser 18 inserts the document into the envelope instead of fabricating the envelope around the document. The envelope material may be advanced through the apparatus by means similar to the means employed to advance the document paper, as discussed herein. The enclosure may also be a pre-fabricated envelope into which the document is inserted and the envelope is sealed closed.

Document encloser 18 may also include an envelope sealing device. As the envelope is fabricated, the envelope is sealed such that the document may later be removed from the envelope without damaging the document. Any suitable means for sealing the envelope material may be utilized. In the embodiments described herein, adhesives are preferred. The envelope material may be pre-treated with adhesive, as described in further detail above. Adhesives may be pressure sensitive, heat sensitive or both pressure and heat sensitive. Suitable means for applying pressure and/or heat may be included in the sealing mechanism as required. Adhesive may also be applied to the envelope material as the envelope is being fabricated.

Document encloser 18 may also include suitable means for separating the envelope material from the envelope material source, preferably continuous roll form paper. The separation means is generally dependent on the form of envelope material employed. In the embodiments described herein, separation means is preferably a knife or other suitable mechanism for shearing the web of continuous roll paper. However, other methods and apparatus may also be employed such as rotary dies, guillotine or scissor style knife arrangements or other separating or cutting means generally known in the art.

If other forms of envelope material are used, suitable separating means must be utilized. For example, if continuous form paper perforated at pre-set lengths is used, the envelope material may be separated at that point by applying appropriate force to burst the perforation. Of course, no separation means is required if pre-cut lengths of envelope material is used.

In the instance where computer-type form feed paper, having margins with spaced holes therethrough, is used as the envelope material, a suitable means for separating the margins from the envelope material is also a function of document encloser 18. Various means may be utilized for separating the margins depending on whether the margins are detachably connected (e.g. by perforations) to the envelope material. If perforations are present, bursting means may be utilized by applying a force to the detachable connection which is sufficient to detach the margin from the enclosure material without tearing the material. Tractor feeds angled away from the direction of travel of the enclosure material may provide sufficient force. A cutting means, such as a knife, may be employed to assist the bursting. In the event that perforations are not present, other separation means can be employed to separate the margins such as knives or other cutting mechanisms combined with tractor feeds or other devices to carry the margin debris away.

Document encloser 18 also may include a label printer for printing information on the envelope. Typical information which would generally be included would be the name of the intended recipient of the document as well as recipient's address or location. Any other information which is desired to be printed on the envelope may also be included. Optionally, this information may be collected directly from the information provided in the document itself. For example, the inside address field of a business letter could be optically or digitally "read" by CMD 12. This information would then be stored and printed by the label printer directly on to the envelope at the appropriate time. A special cover sheet may also be used with predetermined fields in which the information to be printed on the envelope is indicated. The device may also be provided to print a predetermined number of lines directly from the document to the envelope. For example, the first 25 lines of the document would also be printed on the envelope by the label printer.

Document encloser 18 may also include an enclosed document discharge mechanism. This may be any mechanism suitable to transport the sealed enclosure or envelope to the discharge or finished product location of the apparatus. One embodiment of a discharge mechanism may employ motor driven ribbed rubber rollers which engage the outside surface of the envelope and transport the enclosure or envelope to the discharge location of the apparatus. Other suitable discharge mechanisms may also be employed.

FIGS. 3 through 9 illustrate one particular embodiment of this invention. FIGS. 3 through 7 show the mechanical details of CMD 12 of this embodiment. Document printer 14 is not shown in these figures, however, in this embodiment, printer 14 is adjacent to document feed chute 20 such that documents 72 exiting printer 14 discharge directly on to feed chute 20, this may be accomplished by means of guides or may drop directly onto feed chute 11 unaided.

Figure 7:
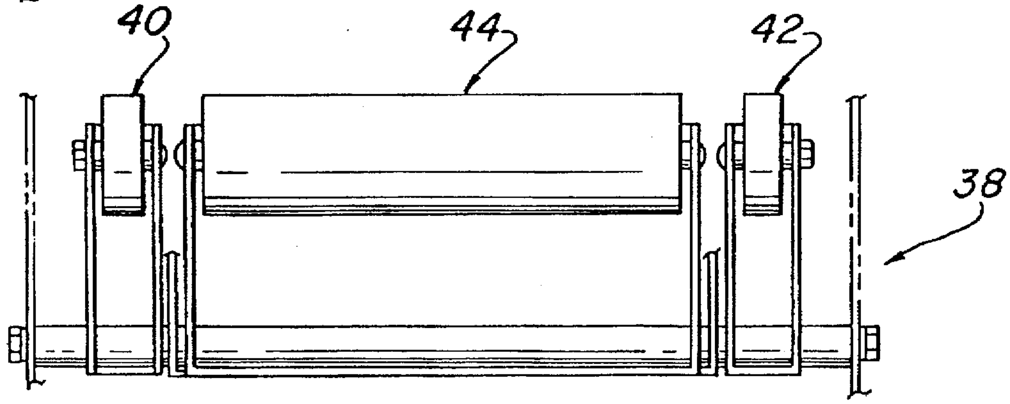
FIG. 7 is a bottom view of FIG. 5.
Figure 8:
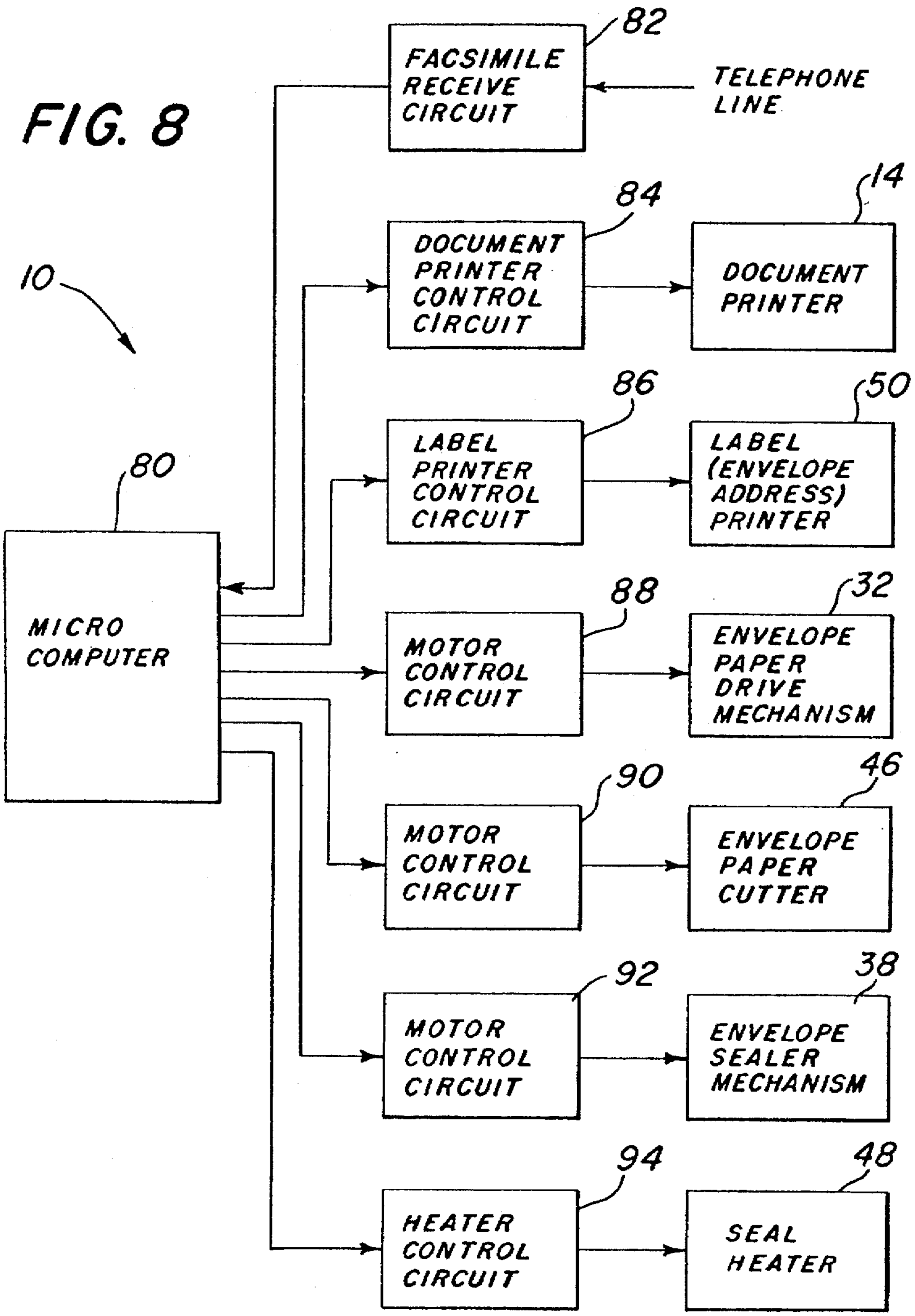
FIG. 8 is a block diagram of the control system suitable for use in the embodiment shown in FIG. 3 and adaptable for use in any embodiment disclosed herein.

FIG. 8 is a block diagram of controller (or control system) 10. Controller 10 can be modified to suit any embodiment of the invention disclosed herein but, as depicted in FIG. 8, is specifically related to the embodiment of the invention shown in FIGS. 3 through 7 and 9A through 9D. FIG. 8 is more specifically suited to the embodiment of the invention which utilizes a facsimile machine as document printer 14, although the controller 10 could be readily adapted for use with any printer 14, such as photocopiers or computer printers.

Turning now to FIGS. 9A through 9D, FIG. 9A is a wiring diagram of seal heater control circuit 94. FIG. 9B is a wiring diagram of seal pressure motor control circuit 92. FIG. 9C is a wiring diagram of envelope cutter motor control circuit 90. FIG. 9D is a tabulation of various components (K0 through K7 and U1) appearing in FIGS. 9A through 9C and their makes and model numbers. The components of FIG. 9D may, however, be interchanged with other suitable means for carrying out similar functions. The circuits illustrated in FIGS. 9A through 9C are exemplary only and variations of that circuitry may also be utilized to carry out the intended functions.

Referring back to FIG. 2, there is seen the elements comprising CMD 12. CMD 12 comprises document printer 14, a document positioner 16 and a document encloser 18. Document printer 14 may be any printing device suitable for printing a document such as facsimile machines, photocopiers, computer printers and the like.

Figure 3:
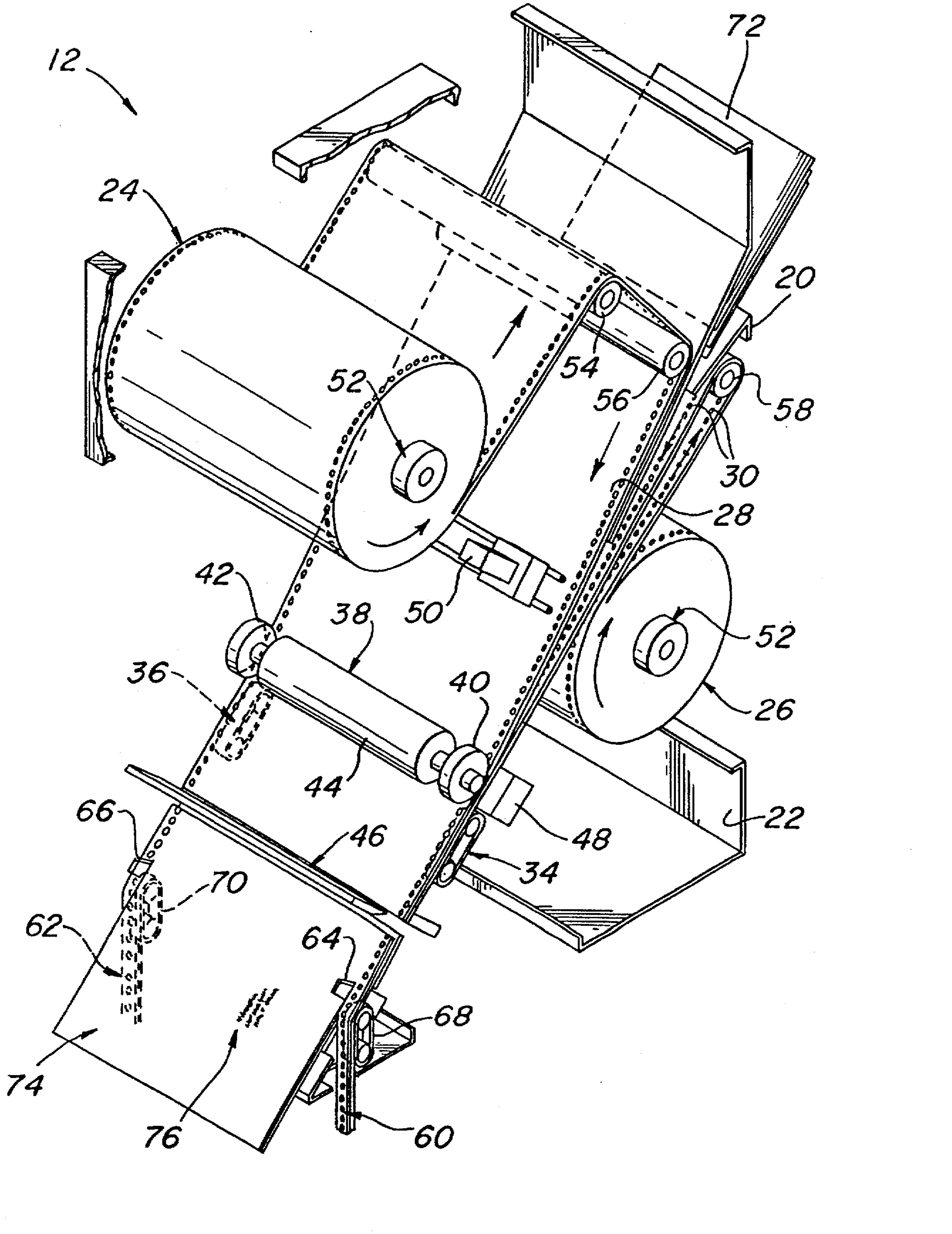
FIG. 3 is an orthographic view of one embodiment of the confidentiality maintenance device, without its supporting structure.
Figure 4:
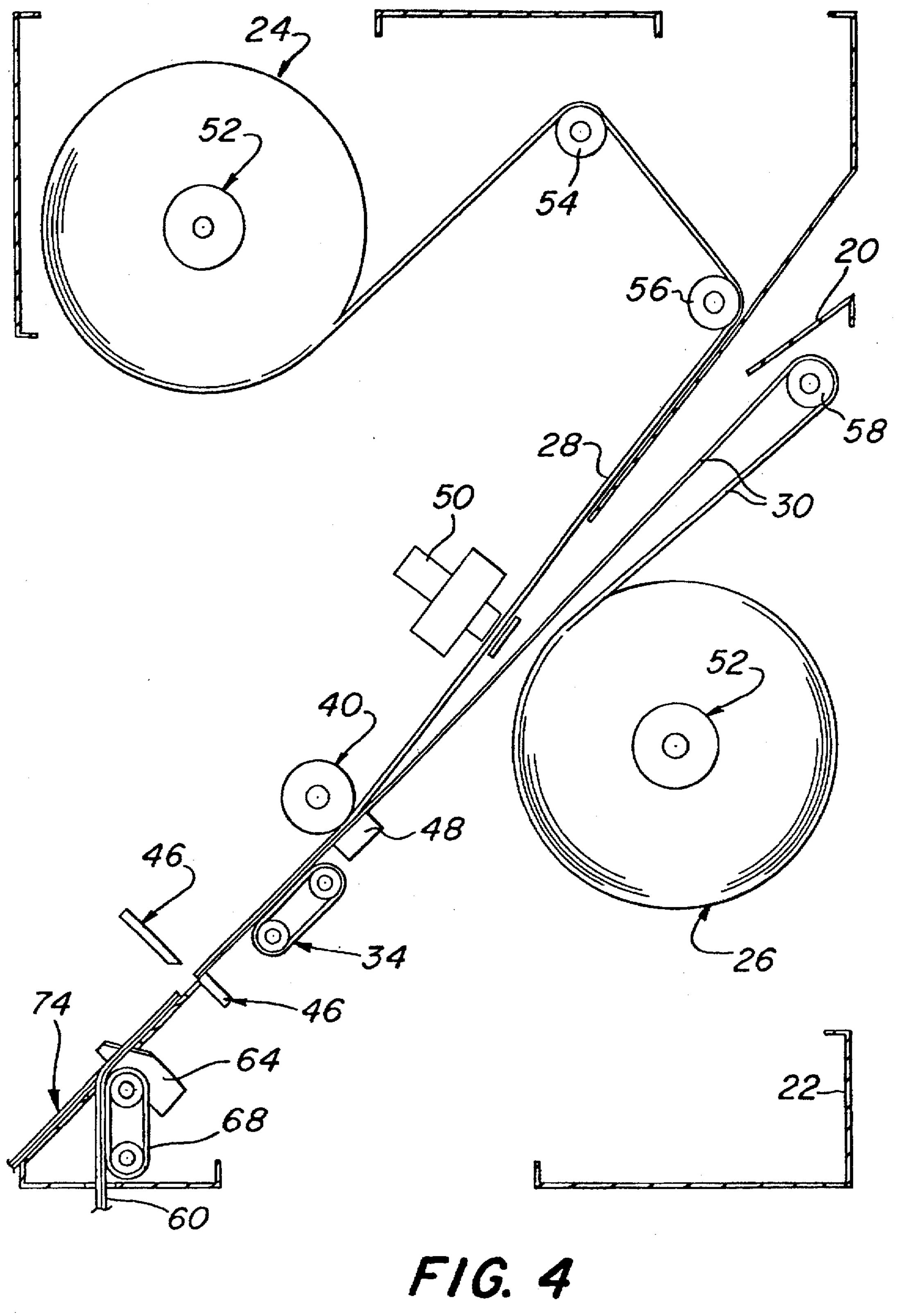
FIG. 4 is a side view of the envelope fabrication device of FIG. 3.

Referring now to the embodiment illustrated in FIGS. 3 and 4, CMD 12 includes: a printer 14 (not shown); a support frame 22; feed chute 20; a first envelope paper supply 24; a second envelope paper supply 26; first envelope web 28; second envelope web 30; an envelope paper drive mechanism 32 (schematically shown in FIG. 8) for advancing both first and second envelope webs, such as tractor feeds 34 and 36; an envelope sealer mechanism 38 (shown in detail in FIGS. 5–7) which may comprise side seal rollers 40 and 42, end seal roller 44; envelope paper cutter 46; and, optionally, seal heater 48. Seal heater 48 may optionally be enclosed in seal rollers 40, 42 and 44 by means of heating element, such as nichrome wire inserted inside each roller causing the surface of each roller to maintain the appropriate heat level in order to effect sealing. A control system 10 callable of performing the necessary control functions is shown in FIG. 8. As shown in the embodiment depicted by FIG. 4, CMD 12 is oriented such that the plane defined by the plane in which the document travels from the time it exits the printing machine (hereinafter referred to as the machine direction plane) is about 45° from normal. This angle allows the document to slide along the machine direction plane to a particular stopping point where the document may be enclosed in an envelope. Optionally, CMD 12 may also include label printer 50 and seal heater 48 as well as other features described herein.

Rolls 24 and 26 and webs 28 and 30 preferably consist of standard sized paper suitable for computer or similar use with tractor feeding mechanisms and which may include detachable clean edge margins such as continuous form feed computer paper, of the type available through Standard Register Corp, Dayton, Ohio. When used as envelope material, adhesive available through Imperial Adhesive, under the trade name "VITEX", described herein, may be applied to webs 28 and/or 30 for the purpose of bonding the two envelope paper webs together. The VITEX adhesive may be applied to envelope webs 28 and 30 prior to installing supply rolls 24 and 26 on CMD 12 or during the operation of the apparatus as an additional process step. The adhesive may be applied to one side of each web so long as the adhesive bearing side faces the other envelope web. Adhesive may be applied to one or both envelope webs 28 and 30. The application may cover the entire side of each web or be applied in any desired pattern. Moreover, the adhesive may be applied to one or both of webs 28 and/or 30 while on the machine allowing for the usage of standard tractor feed computer paper in roll form for one or both envelope paper webs. Typically, the adhesive is either heat or pressure sensitive or both heat and pressure sensitive. The web paper may be supplied in 15 lb. rolls of 5000 pages each.

Alternatively, conventional 24 lb. check ledger stock paper rolls coated with a wax/polymer adhesive may be used in those embodiments of the invention which utilize combination heat and pressure sensitive adhesive. Such coated stock (TECHPAK Adhesive SRD-1) may be obtained from Franklin P. P., Inc. of Franklin, Ohio. For those embodiments of the invention which utilize pressure only sensitive adhesive, cold weld adhesive, such as the type used in the candy industry, may be utilized.

First and second web rolls comprise paper wound around a center core 52, which include bearing surfaces, allowing the cores to be rotatably mounted to a fixed surface such as frame 22 of CMD 12. Guide rollers 54, 56 and 58 also include bearing surfaces, similar to those of center core 52, rotatably mounted to a fixed surface, such as frame 22 of CMD 12. The web roll feed can be controlled by any suitable means. One such means is the implementation of friction clutches and servo motors which control the feed of rolls 24 and 26. The friction clutches and servo motors (clutch/motor system) may also be employed to retract excess web-feed. If used in conjunction with bi-directional tractor feeds, or other suitable web drive mechanism, the clutch/motor system may retract the envelope web for a variety of purposes including for printing on the envelope at any desired location. The clutch/motor system may also be used to retract the document and/or envelope webs to any position in the apparatus.

Tractor feeds 34 and 36 are standard, motor driven computer paper, conveying devices which positively position first and second webs 28 and 30. Tractor feeds 34 and 36 are preferably NEC PINWRITER P6300's, available through NEC TECHNOLOGIES, INC. Tractor feeds 34 and 36 may be mounted in various orientations and groupings so that the envelope paper webs are conveyed through CMD 12 smoothly and without buckling or jamming. Alternative forms of drive mechanisms and paper guides may also be employed to assure positive placement of webs 28 and 30. For example, conveyors or guide means or a combination of conveyors and guide means may be employed. The type of conveying means chosen may be, in part, a function of the type of paper utilized. As mentioned, tractor feeds may be utilized with margined, continuous feed computer-type paper. For non-margined paper, a system of friction (e.g. rubber) or pressure rollers may be utilized while the paper is guided on either side of the web or sheet (where the margins would normally be attached) by C-shaped channels. These channels may be suitably enclosed to prevent the paper from leaving the path guides. The roller friction drive means may be positioned such that the rollers would contact any desirable point on the surface of the paper. Other material handling devices may also be employed to convey and positively position the envelope and document webs. For example, sealer mechanism 38 may be adapted to include driven pressure rollers 40, 42 and 44, such that the rollers drive the envelope and, optionally, the document webs as the rollers seal the envelope.

Cutter 46 may be a guillotine or similar style cutting mechanism which is actuated to separate a predetermined length of paper from webs 28 and 30. In this embodiment, cutter 46 is AZCO Corp.'s Model SC-12, actuated by AZCO Corp.'s Model 85616-2.

Figure 5:
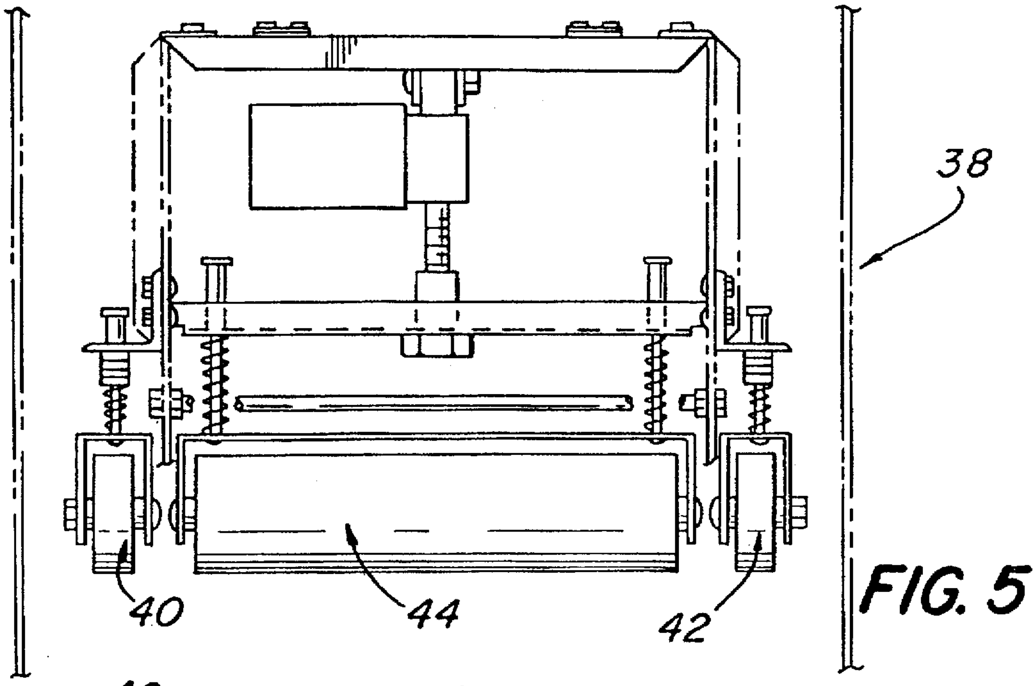
FIG. 5 is a rear view of a seal pressure roller mechanism suitable for use in the embodiments of the invention disclosed herein.
Figure 6:
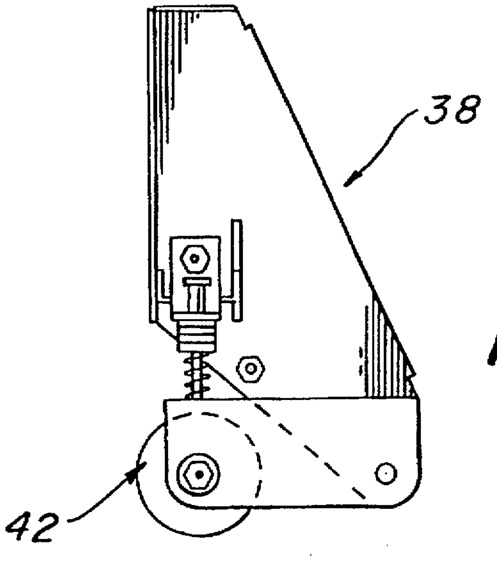
FIG. 6 is a side view of FIG. 5.

With reference to the sealing mechanism depicted in FIGS. 5–7, rollers 40, 42 and 44 may be made from any suitably resilient, non-marking material, such as plastic or rubber. The rollers are rotatably mounted such that they apply sufficient pressure to webs 28 and 30 to seal the envelope paper webs together while simultaneously allowing the web conveying mechanism to advance the envelope through the sealer. Detail of the sealing mechanism of the embodiment shown in FIG. 3 is depicted in FIGS. 5, 6 and 7. End roller 44 may be actuated by a motor actuator, preferably "Model 85616-1". Optionally, heater 48 may be utilized to assist in the activation of heat activated adhesion material and the sealing of envelope webs 28 and 30. A suitable heater mechanism may include an OMEGALUX, Catalog No. SNH-12/120 heater and OMEGALUX, Catalog No. CN351-JF3 heater controller. One form of sealer control system is depicted in FIGS. 8 and 9B and, optionally, 9A if heat is employed in the sealing function.

Label printer 50 may also be incorporated in CMD 12. Referring again to FIGS. 3 and 4, printer 50 may be slideably mounted to print desired information on the outside of the envelope. Such information may include the name and address of the person to whom the document is intended, delivery and handling instructions, identification of the contents of the envelope, company logo, bar coding and the like. Printer 50 may be any suitable printer such as a high resolution dot matrix printer, such as NEC PINWRITER P6300, available from NEC TECHNOLOGIES, INC. A suitable label printer control system is depicted in FIG. 8. The location of the printed label on the finished enclosed product 74 may be adjusted as desired. FIG. 3 shows one possible printing location at 76.

Referring again to FIGS. 3 and 4, margins 60 and 62 may be removed from sealed webs 28 and 30 after the webs are cut by cutter 46. Removal of margins 60 and 62 may be automatically accomplished by cutting margins 60 and 62 just inside the tractor feed holes of unperforated paper or along the clean edge perforation with blades 64 and 66. Margins 60 and 62 are guided away from webs 28 and 30 by conveyors 68 and 70. Conveyors 68 and 70 may be the same tractor feed mechanisms as tractor feeds 34 and 36. Conveyors 68 and 70 may be mounted such that they are angled away from webs 28 and 30. This angle need only be great enough to separate the margin from webs 28 and 30. Angles in any direction of less than five degrees from the direction of travel of webs 28 and 30 may be sufficient to achieve separation without tearing the envelope paper webs, although angles of greater than five degrees may also be possible. In any event, the angle and direction of the angle are not critical, so long as the margin is separated and guided away from webs 28 and 30 without tearing or otherwise damaging the webs. This margin removal system may also be used for removing the margins from a document paper, if such paper is utilized. This system, as well as the alternative margin removal system described below, is also adaptable for use with any of the embodiments of the invention described herein.

Alternatively, when perforated marginal paper is utilized, margins 60 and 62 may be separated and removed from webs 28 and 30 without the need for utilizing blades 64 and 66. Conveyors 68 and 70 may be oriented at such an angle so as to direct the margins away from webs 28 and 30. The entire web being in tension with an increasing component of force perpendicular to the direction of travel of webs 28 and 30 as webs 28 and 30 advance will eventually cause the margins to tear free along the perforation. The angle and direction of the angle at which conveyors 68 and 70 are oriented are not critical so long as the margin is separated and guided away from webs 28 and 30 without tearing or otherwise damaging the webs.

The apparatus of this invention also includes the necessary control systems 10 to which provides the proper commands and sequencing to CMD 12 such that the apparatus performs each function described herein. Control system 10 may comprise any type of suitable control devices such as microcomputers and programmable controllers. Mechanical and analog systems may also be employed to control the various functions and sequencing of the components of the apparatus. For example, a microcomputer, such as AST Research, Inc.'s microprocessor model AST Premier/283, controls the functions and sequencing of the embodiment shown in FIG. 3. FIG. 8 is a block diagram of the control system employed by the apparatus of FIG. 3 in the case that the document printer is a facsimile machine. FIG. 8 depicts the flow of data from data receiving circuit 82 to micro computer 80 and the flow of data from micro computer 80 to various control circuitry and, in turn, to various control elements. In the embodiment of FIG. 3 where document printer 14 is a control system for a facsimile machine, the data received is digital data received over a telephone line. Facsimile receiving circuit 82 receives this data and transfers it to micro computer 80 for storage and processing.

For the embodiment of the invention shown in FIG. 3; FIG. 9A depicts heater control circuit 94 which controls the operation and temperature settings of seal heater 48; FIG. 9B depicts end seal roller pressure actuator motor control circuit 92 which controls the motor which actuates envelope sealer mechanism 38; and FIG. 9C depicts envelope paper cutter actuator motor control circuit 90 which controls the motor which actuates envelope paper cutter 46. In addition, FIG. 8 schematically depicts control circuitry for document printer 14 (document printer control circuit 84), label printer 50 for the envelope adhesives (label printer control circuit 86), and the envelope paper drive mechanism 32 (envelope paper drive mechanism motor control circuit 88). Each of these control circuits may utilize circuitry commonly known in the art.

Details of particular control circuits are set forth in FIGS. 9A through 9C.

A suitable program for micro computer 80 may be employed depending on the functions and sequences of various components present in any particular embodiment of the invention. A program written in "C" for testing the envelope-forming functions of CMD 12 of the embodiment depicted in FIGS. 3 through 8 and 9A through 9D is set forth below:

```
/****************************************************************************/
/*   This program tests the envelope-forming components of the Secure Fax   */
/*   Machine:  paper routing, paper drive, address print head, heater,       */
/*   sealing pressure adjust, and paper cutter.                 10/2/91      */
/****************************************************************************/

#INCLUDE "stdio"

int port2_dat;

/**************************************************************/
/*                          OUTPUTS                           */
/**************************************************************/
/* bits 5-7 | bit 4  | bit 3  | bit 2  |    bit 1   | bit 0 */
/*   un-    | cutter | roller | cutter | roll press | heater */
/* assigned | up/dn  | up/dn  | power  |   power    | power  */
/**************************************************************/

int port1_dat;
/*********************************************************************/
/*                              INPUTS                               */
/*********************************************************************/
/* bits 6-7 | bit 5  | bit 4  | bit 3 | bit 2 |  bit 1   |  bit 0    */
/*   un-    | roller | roller | knife | knife |   FAX    |   FAX     */
/* assigned |   up   |  down  |  up   | down  | complete | incoming  */
/*********************************************************************/

int status;
int choice;

void delay();     /* Function creates delay of no. of counts */
void mov_paper(); /* Function slowly advances paper a no. of lines*/
void prep_env();  /* Function prepares envelope after loading paper*/
```

P' US 92/11155

```
            void wait_fax();  /* Function waits for a fax to come in*/
    void fill_env();  /* Function waits for completion of fax message*/
    void trim_env();  /* Function trims excess from bottom of envelope*/
    void print_env(); /* Function prints address on envelope */
    void cut_env();   /* Function cuts off completed envelope*/

    FILE *printer;    /* Open file "printer" for printing */
                 /* address on envelope              */
main()
{
    choice = 0;
    printer = fopen("lptl:","a");
    clrscrn();
    outp(0x30C,0x04;  /* Port 2 is output, Ports 1 and 0 are inputs*/
{
    while  (choice != 4)
{
        printf("\n\n\n\n         Select a function by entering the ");
        printf("appropriate integer");
        printf("\n\n             (1) Receive FAX (Untrimmed ");
        printf("Envelope)");
        printf("\n               (2) Receive FAX (Trimmed ");
        printf("Envelope)");
        printf("\n               (3) Envelope Preparation");
        printf("\n               (4) Exit");
        printf("\n\n             Enter Secltion:");

        scanf("%d", &choice);

        switch(choice)
        {
               case 1:  wait_fax();
                        fill_env();
                        print_env();
                        cut_env();
                        clrscrn();
                        break;
               case 2:  wait_fax();
                        fill_env();
                        print_env();
                        trim_env();
                        cut_env();
                        clrscrn();
                        break:
```

```
                                case 3:  prep_env();
                              clrscrn();
                              break;
                     case 4:  clrscrn();
                              break;
                    default:  break;
              }
         }
       status = fclose (printer);
         printf("\n\n\n\n             FAX Test Completed\n");
    }

    void delay(period)     /* Function to create a delay of (period) counts */
    long period;
    {
         while (period-- > 0);
    }

    void mov_paper(lines)
    int lines;
    {
         do
         {
              fprintf(printer, "\n");
         }
         while(lines-- > 0);
         }
    void pre_env()
    {
         outp(0x30F,0x03); /* Heater ON, Roller DOWNWARD, Cutter UP */
                           /* Wait for Roller to operate (wait for */
                           /* bit 4 of Port 1 to turn on) */
         do
         {  port1_dat = inp(0x30E);
            port1_dat &= 0x10;  }       /* Mask all but bit 4 */
         while (port_dat != 0x10);
         outp(0x30F,0x01);  /* Remove prw from Roller actuators */
         delay(20000L);     /* Wait for Heater to warm up to seal envelope */

         mov_paper(32);
         delay(20000L);    /* Wait for printer to catch up */
         outp(0x30F,0x00);
         outp(0x30F,x0.04); /* Heater OFF, Roller DOWN, Cutter DOWNWARD */
                           /* Wait for Cutter to operate (wait for */
                           /* bit 2 of Port 1 to turn on) */
```

…JT/US 92/11155

```
            do
        {  port1_dat = inp(0x30E);
           port1_dat &= 0x04; } /* Mask all but bit 2 */
        while (port1_dat != 0x04);
        outp(0x30F,0x00); /* Actuator power off */
        delay (500L);
        outp(0x30F,0x10); /* Change direction of cutter actuator */
        delay (500L);
        outp(0x30F,0x14); /* Heater OFF, Roller DOWN, Cutter UPWARD */
                          /* Wait for Cutter to operate (wait for */
                          /* bit 3 of Port 1 to turn on) */
        do
        {  port1_dat = inp(0x30E);
           port1_dat &= 0x08; } /* Mask all but bit 3 */
        while (port1_dat != 0x08);
        outp(0x30F,0x00);
        delay (500L);
        outp (0x30F,0x0A);/* Heater OFF, Roller UPWARD, Cutter UP */
                          /* Wait for Roller to operate (wait for */
                          /* bit 5 of Port 1 to turn on) */
        do
        {  port1_dat = inp(0x30E);
           port1_dat &= 0x20; }   /* Mask all but bit 5 */
        while (port1_dat !=0x20);
        outp(0x30F,0x00); /* Heater OFF, Roller UP, Cutter UP */
}

void wait_fax()
{
        clrscrn();
        poscurs(12,30);
        printf("Awaiting incoming FAX");

        do          /* Wait for bit 0 of Port 1 to turn on (incoming FAX) */
        {  port1_dat = inp(0x30E);
           port1_dat &= 0x01; }  /* Mask all but bit 0 */
        while (port1_dat !=0x01);
}
void fill_env()
{
        clrscrn();
        outp(0x30F,0x01); /* Heater ON, Roller UP, Cutter UP */
        delay (20000L);  /* Wait for Heater to warm up */
        poscurs (12,30);
        printf("Awaiting end of FAX");
```

PCT/US 92/11155

-30-

```
            do   /*Wait for bit 1 of Port 1 to turn on (FAX complete) */
        {   port1_dat = inp(0x30E);
            port1_dat &= 0x02; } /*  Mask all but bit 1 */
        while (port1_dat != 0.02);
    }
    void print_env()
    {
        mov_paper(6);
        fprintf(printer,"     FROM: XYZ Corp. \n\n");
        fprintf(printer,"     TO:   PDI CORP. \n\n");
        fprintf(printer,"     REF:  Your FAX 8/26/91 \n\n\n");
        fprintf(printer,"     *****************************************");
        fprintf(printer,"******************** \n");
        fprintf(printer,"     *                                        ");
        fprintf(printer,"                  * \n");
        fprintf(printer,"     *                                        ");
        fprintf(printer,"                  * \n");
        fprintf(printer,"     *                                        ");
        fprintf(printer,"                  * \n");
        fprintf(printer,"     *                                        ");
        fprintf(printer,"                  * \n");
        fprintf(printer,"     *                                        ");
        fprintf(printer,"                  * \n");
        fprintf(printer,"                                              ");
        fprintf(printer,"     *            * \n");
        fprintf(printer,"                                              ");
        fprintf(printer,"                  * \n");
        fprintf(printer,"     *                                        ");
        fprintf(printer,"                  * \n");
        fprintf(printer,"     *                                        ");
        fprintf(printer,"                  * \n");
        fprintf(printer,"     *                                        ");
        fprintf(printer,"                  * \n");
        fprintf(printer,"     *                                        ");
        fprintf(printer,"                  * \n");
        fprintf(printer,"     *                                        ");
        fprintf(printer,"                  * \n");
        fprintf(printer,"     *                                        ");
        fprintf(printer,"                  * \n");
        fprintf(printer,"     *****************************************");
        fprintf(printer,"******************** \n");
        delay (100000L);      /* Wait for printer to catch up */
    }

    void trim_env()
    {
```

```
            delay(36000L);        /* Wait for printer to catch up */
    clrscrn();
    outp(0x30F,0x05); /* Heater ON, Roller UP, Cutter DOWNWARD */
                          /* Wait for Cutter to operate (wait for */
                          /* bit 2 of Port 1 to turn on) */
    do
    { port1_dat = inp(0x30E);
      port1_dat &= 0x04; }        /* Mask all but bit 2 */
    while (port1_dat = != 0x04);
    outp(0x30F,0x01);     /* Actuator power off, but heater still on */
    delay(500L);
    outp(0x30F,0x11);     /* Change direction of cutter actuator */
    delay(500L);
    outp(0x30F,0x15);     /* Heater ON, Roller UP, Cutter UPWARD */
                          /* Wait for Cutter to operate (wait for */
                          /* bit 3 of Port 1 to turn on) */

    do
    {  port1_dat = inp(0x30E);
       port1_dat &= 0x08; } /* Mask all but bit 3 */
    while (port1_dat ! = 0x08);
    outp(0x30F,0x01); /* Heater ON, Roller UP, Cutter UP */
}

void cut_env()
{
    mov_paper(50);
    if(choice == 1)

        delay(27000L);  /* Wait for printer to catch up */
    delay(20000L);
    outp(0x30F,0x03);     /* Heater ON, Roller DOWNWARD, Cutter UP */
                          /* Wait for Roller to operate (wait for  */
                          /* bit 4 of Port 1 to turn on) */
    do
    {  port1_dat = inp(0x30E);
       port1_dat &= 0x10; }       /* Mask all but bit 4 */
    while (port1_dat != 0x10);
    outp(0x30F,0x01);     /* Heater ON, Roller DOWN, Cutter UP */
    mov_paper(32);
    delay(12000L);
    outp(0x30F,0x05);     /* Heater ON, Roller DOWN, Cutter DOWNWARD */
                          /* Wait for Cutter to operate (wait for */
                          /* bit 2 of Port 1 to turn on) */
```

-32-

```
            do
      {  port1_dat = inp(0x30E);
         port1_dat &= 0x04; } /*Mask all but bit 2 */
      while (port1_dat != 0x04);
      outp(0x30F,0x01);     /* Actuator power off, but heater still on*/
      delay(500L);
     outp(0x30F,0x11);     /* Change direction of cutter actuator */
      delay(500L);
      outp(0x30F,0x14);     /* Heater OFF, Roller DOWN, Cutter UPWARD */
                            /* Wait for Cutter to operate (wait for */
                            /* bit 3 of Port 1 to turn on) */
      do
      {  port1_dat = inp(0x30E);
         port1_dat &= 0x08;) } /* Mask all but bit 3 */
      while (port1_dat != 0x08);
      delay (500L);
      outp(0x30F,0x00);
      delay(500L);
      outp(0x30F,0x08); /* Heater OFF, prepare to raise Roller, Cutter UP */
      delay(500L);
      outp(0x30F,0x0A);     /* Heater OFF, Roller UPWARD, Cutter UP */
                            /* Wait for Roller to operate (wait for */
                            /* bit 5 of Port 1 to turn on) */
      do
      {  port1_dat + inp(0x30E);
         port1_dat &= 0x20; }  /* Mask all but bit 5 */
      while (port1_dat !=0x20);
      outp(0x30F,0x00);     /* Heater OFF, Roller UP, Cutter UP */
}
```

The foregoing control system 10 may be adapted by means disclosed herein as well as by means commonly known in the art to control any of the several embodiments of CMD 12 disclosed herein.

The embodiment of the invention depicted in FIGS. 3, 4, and 5, operates as follows. Individual sheets of printed material (document(s)) 72 exiting from a printer, such as a facsimile machine, photocopier or computer printer, are deposited on feed chute 20. Sheets 72 slide down web 30 to the point where web 28 comes essentially in contact with web 30 at which point sheets 72 stop and accumulate until the document printing function is complete. Once printed sheets 72 are stacked on web 30, both web 28 and web 30 are advanced by tractor feeds 34 and 36. As the webs advance, label printer 50 prints the desired information on web 28. Webs 28 and 30 are sealed together by a system of rollers 40, 42 and 44, shown in further detail in FIG. 5, which press webs 28 and 30 together. Pressure from rollers 40 and 42 causes the preapplied adhesive to continuously seal the margins of webs 28 and 30 together to form a sealed envelope. The force applied by rollers 40 and 42 is controlled by the spring mechanism shown in FIG. 5. The seal on each end of the envelope or package is made by pressure exerted from roller 44. During the time sheets 72 are passing under roller 44, roller 44 is not in contact with web 28. After sheets 72 have passed under roller 44, roller 44 is lowered to contact with web 30 and the requisite pressure required to seal the end of the envelope is applied. The force applied by the center roller may be controlled by the system of springs and electric actuator shown in FIG. 5.

Optionally, heat may be applied in conjunction with the application of pressure to the margins and end seals if a heat reactive adhesive is used. In the embodiment depicted in FIGS. 3 and 4, rollers 40, 42 and 44 press webs 28 and 30 against heater 48, which assists in the sealing of webs 28 and 30. Temperatures and dwell times for such a heating process will vary with the type of thickness of paper and the type of adhesive used. Temperatures of about 160° F. up to about 180° F. and a dwell time of about 0.5 sec. are typical when Standard Register paper and "VITEX" adhesive is utilized. Optionally, rollers 40, 42 and 44 may be equipped with an internal electric heating element. This heating element may be controlled to provide heat to the outer surface of roller 44.

Being sealed on all four sides, the envelope or package is advanced again by tractor feeds 34 and 36 to a position such that the portion of the envelope last sealed (hereinafter referred to as the "top end") is positioned just below cutter 46, at which point cutter 46 is actuated and cuts through webs 28 and 30, separating the sealed envelope enclosure from webs 28 and 30. The end of webs 28 and 30 remaining after envelope 74 has been separated are sealed and prepared to receive the next document. The remaining end is sealed because cutter 46 cuts through approximately the center of the end seal created by roller 44.

After the sealing and separating steps are complete, envelope 74 may drop into delivery bin (not shown) or other device for further processing with margins 60 and 62 intact or, alternatively, employ a means fore automatically separating the margins from envelope 74. As described above, margins 60 and 62 may be removed by cutting margins 60 and 62 from envelope 74 while simultaneously stripping away margins 60 and 62 by conveying means 68 and 70. After the margins are removed, CMD 12 is prepared to accept a new document and repeat the cycle.

Regardless of the precise embodiment of the invention adopted, CMD 12 and controller 10 include the necessary controls and circuitry to control the functions and sequencing of the apparatus including those related to advancing the webs, printing the label, regulating the heaters, lifting and lowering the end seal roller, actuating the envelope cutter, and striping the margins.

In accordance with another embodiment of this invention, CMD 12 may be adapted to enclose documents which exit a facsimile machine, computer printer, photocopier or other printing device. Essentially, this embodiment employs the same basic components as does the embodiment shown in FIG. 3 with the exception that CMD 12 does not rely on gravity as a means to transport the document from the discharge end of the printing machine and position the document such that it may be enclosed in an envelope. Rather, the document is positively transported by conveying means, such as the tractor feeds utilized in the foregoing embodiment. Because this embodiment utilizes positive placement and conveyance of the documents and envelope materials, it is possible to orient this embodiment at various angles from normal to suit the particular requirements of the printing device or space considerations.

Figure 10:
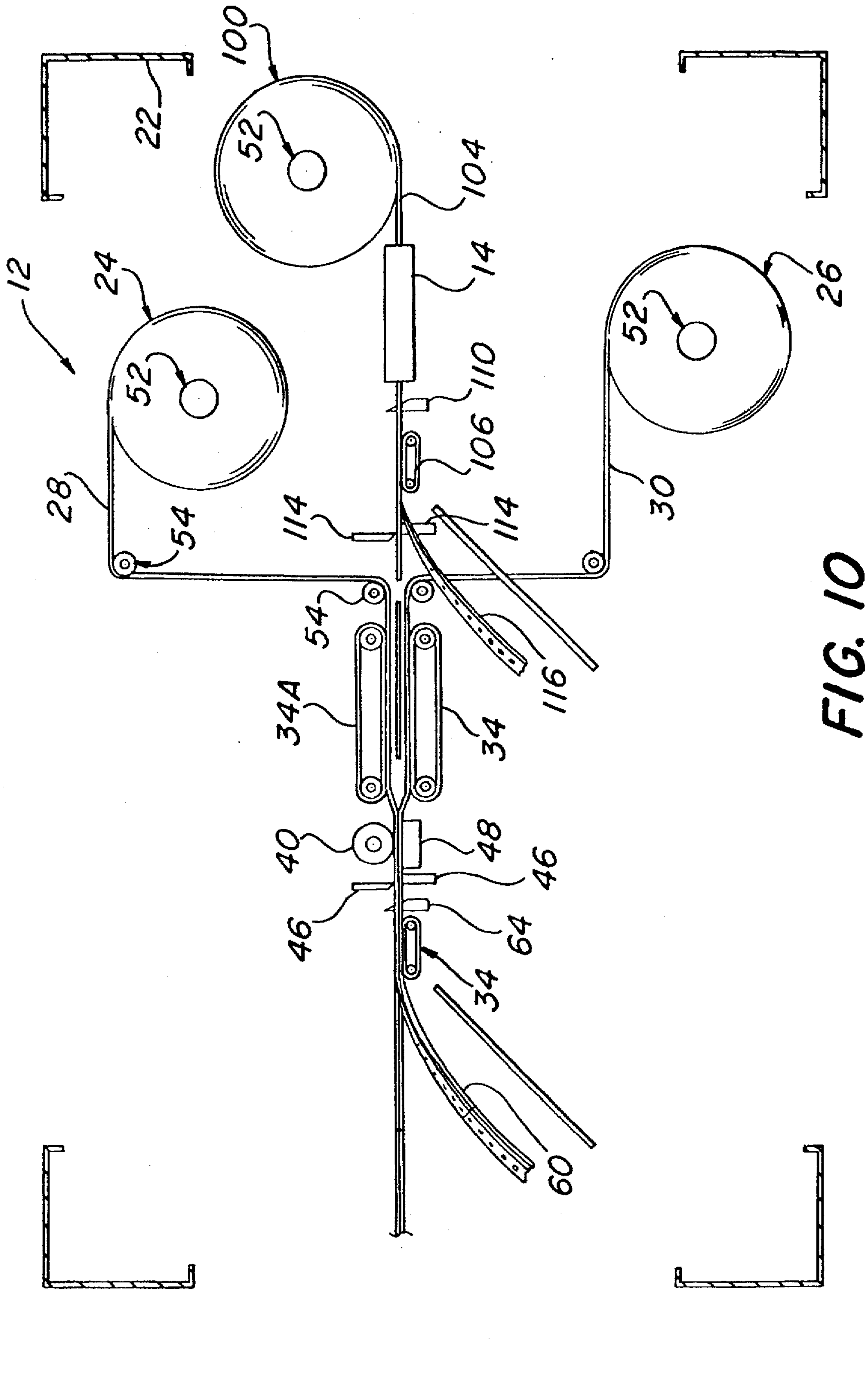
FIG. 10 is a side view schematic of a horizontally oriented embodiment of the document confidentiality maintenance device of FIG. 1 wherein the document is printed on continuous form paper and said envelope is fabricated from two sources of continuous form paper.

One such embodiment is depicted in FIG. 10. This embodiment discloses an essentially horizontal machine plane angle (at or about zero degrees (0°)), however, the concept of this embodiment may be utilized with virtually any machine plane angle. In this embodiment CMD 12 comprises machine frame 22, printer 14, document paper web supply 100, first envelope paper web supply 24, second envelope paper supply 26, document web 104, first envelope web 28, second envelope web 30, document paper cutter 102, a mechanism for advancing both first and second envelope webs 28 and 30 such as tractor feeds 34 and 36 (not shown), an envelope sealer such as seal rollers 40, 42 and 44, envelope paper cutter 46 and a control system 10 capable of performing the necessary control functions and sequencing. Optionally, CMD 12 may also include label printer 50, seal heater 48, margin stripping systems, as well as other features described herein.

In addition to the common features shared between the embodiment of FIG. 10 and that of FIGS. 3 through 8 and 9A through D, the embodiment disclosed in FIG. 10 provides a means for handling continuous roll paper, such as that employed for fabrication of the envelope, as the paper supply for printing the document. Margined or non-margined paper may be utilized as described herein. Document paper supply 100 is similar to envelope paper supplies 24 and 26. Documents are printed by printer 14, which may be a facsimile machine, photocopier or computer printer, or other printing device. Document web 104 advances by any suitable conveying means, such as left and right document tractor feeds 106 and 108 respectively (108 not shown). Tractor feed 108 is located at second document margin 118 (not shown) opposite of left tractor feed 106, which engages left document margin 116. Other conveying means described herein may be utilized if non-margined paper is used for the document supply. The document margin is stripped as it exits the printer by means described for stripping the envelope margin described herein. The embodiment illustrated by FIG. 10 includes left and right document paper margin blades 110 and 112, respectively (112 not shown) and tractor feeds 106 and 108 (108 not shown) as the stripping means. Document web 104 then advances to document paper cutter 114 (similar to that of envelope cutter 46) wherein document web 104 is separated or cut into pages of desired length. As document web 104 advances for cutting, a portion of the web advances to be deposited on envelope web 30. When the desired length of document web 104 has advanced (typically a page length of document 72), document cutter 114 separates the desired length from document web 104. The printing and cutting of pages is repeated, stacking each page of document 72, until document 72 is in condition for envelope 74 to be fabricated and sealed. Envelope 74 is fabricated in a similar manner as described in the embodiment of FIG. 3 with certain exceptions. One exception is that envelope web 28 is driven by upper right and left tractor feeds 34A and 36A respectively (36A not shown) rather than being driven by tractor feeds 34 and 36. This feature alleviates the necessity of employing gravity as a document positioning means. The instant embodiment therefore provides for positive positioning of document 72 which will reduce the risk of paper jamming because of misplacement and the effects of static buildup on the sliding surfaces of FIG. 3 as well as allow for usage of document supply papers which tend to curl and jam such as thermal sensitive facsimile paper and the like.

This embodiment also enables the document paper on which no printing has taken place to be retracted to the printer for further use. After the last page of a document is deposited on envelope web 30, remaining web 104 may be retracted back into printer 14 by means of reversible or bi-directional tractor feeds, or similar conveying mechanism, and the clutch/motor device described herein. The type of conveying means employed may vary with the type of document paper utilized. This feature saves paper and alleviates the problem of having blank sheets appear in document 72.

Once document 72 has been deposited on web 30, tractor feeds 34, 36, 34A and 36A advance first and second envelope webs 28 and 30 to sealing mechanism 38, which includes seal pressure rollers 40, 42 and 44 and which may also utilize seal heater 48 for sealing envelope 74 as described above. Envelope 74 is then separated from envelope webs 28 and 30 and, if necessary, envelope web margins 60 and 62 (not shown) are stripped by tractor feeds 34 and 36 (not shown) and, optionally, by blades 64 and 66 (66 not shown).

Label printer 50 (not shown) may also be utilized with this embodiment. A control system 10 suitable for controlling the functions and sequencing of this embodiment is also provided and can be readily understood from the disclosure herein.

Figure 11:
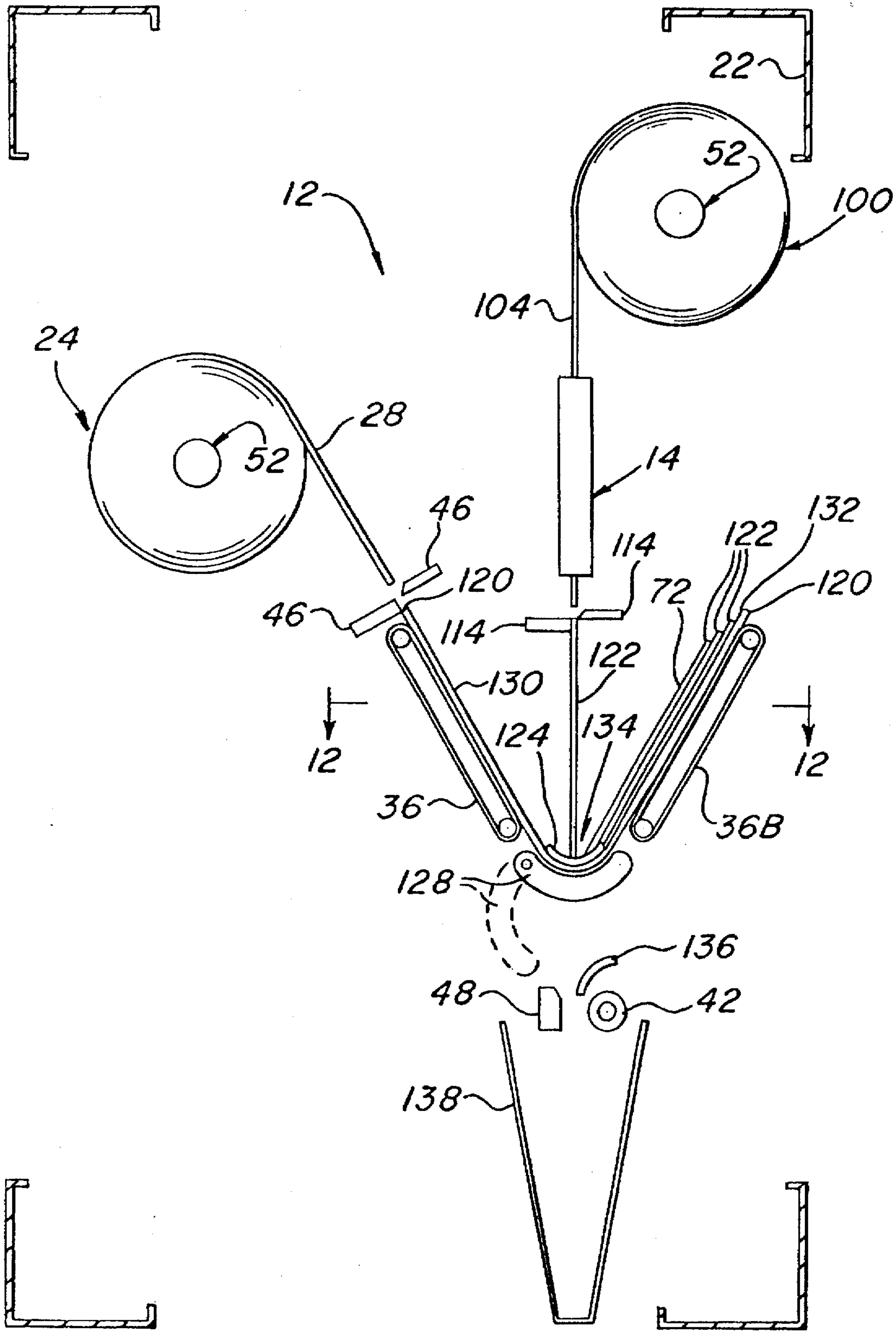
FIG. 11 is a side view schematic of a vertically oriented embodiment of the document confidentiality maintenance device employing a single source of envelope web paper wherein the single web is formed into a cupped or U- or V-shaped web.
Figure 12:
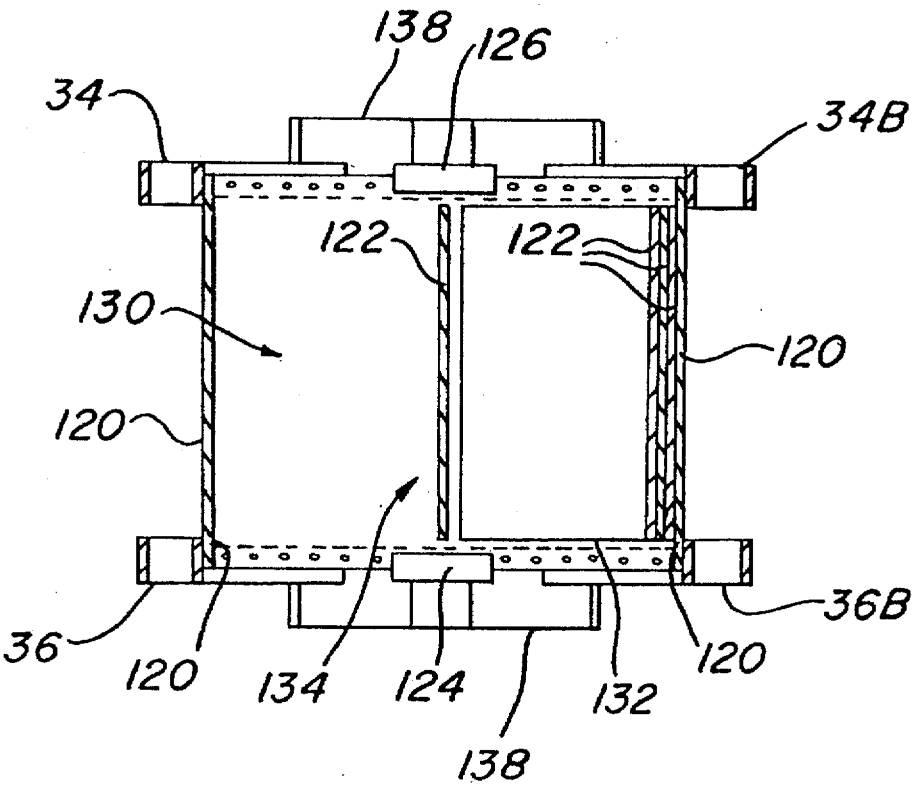
FIG. 12 is a top view schematic of the device of FIG. 11 as viewed from cross section 12—12.

Turning now to another embodiment of this invention, FIGS. 11 and 12, illustrate an embodiment in which CMD 12 is in a vertical position. This embodiment employs document printer 14 similar to printer 14 utilized by the embodiment depicted in FIG. 10. Document paper web supply 100 is preferably non-margined paper, however, it is possible to incorporate document margin stripping means in this embodiment through the use of blades 110 and 112 (not shown) and/or conveyors 106 and 108 (not shown), of FIG. 10.

In this embodiment a single envelope web supply 24 is provided. Envelope web 28 advances to form a single U- or V-shaped envelope web 120 by conveying means discussed above. As illustrated, the embodiment shown in FIG. 11 utilizes margined paper. Accordingly, envelope web 28 is conveyed by left and right tractor feeds 34 (not shown), 36, 34B (not shown), and 36B respectively which operate together with web guides 124, 126 and 128 to form U- or V-shaped web 120. Other arrangements of guides and/ or conveying mechanisms may be utilized. For example, additional margin guides similar to web guides 124 and 126 may extend the length of each tractor feed. For non-margined paper the C-shaped channel and friction roller conveying means described above may be used in place of tractor feeds 34, 36, 34B and 36B. A conveying system comprising sideguides and upper and lower path molded guides may also be utilized with non-margined papers.

U- or V-shaped envelope web 120 comprises first and second surfaces 130 and 132 respectively and a vertex 134. First and second surfaces 130 and 132 and vertex 134 are sections of envelope web 120 identified for positioning purposes and to more clearly define the invention. As shown in FIGS. 11 and 12, first and second surfaces 130 and 132 are defined as the inside straight surfaces of envelope web 120. These are the surfaces between which document 72 is positioned prior to fabrication of envelope 74. Vertex 134 is the curved inside surface of U-shaped web 120 which lies between first and second straight surfaces 130 and 132 and along which the envelope is folded when document 72 is enclosed in the envelope 74.

After envelope web 120 is positioned so as to receive document 72, envelope web 120 is separated from web 28 by cutter 46.

The document printing function of this embodiment is the same as the printing function of the embodiment of FIG. 10. There may, however, be differences in the printing functions depending on the type of paper used. Document web 104 is conveyed from document paper supply 100 and through printer 14 (which may be a facsimile machine, computer printer, photocopier or any other printing device), by the paper conveying device utilized by printer 14. Alternatively, other conveying means may be provided external to printer 14. When the desired length of document web 104 has advanced (typically a page of document 72) the document cutter 114 separates the desired length (hereinafter "page 122") from document web 104. Page 122 falls, by gravitational force, into vertex 134 of envelope web 120 which has already been positioned to receive page 122. The printing, cutting or separating and stacking of document 72 (wherein document 72 comprises one or more pages 122) in web 120 is repeated until document 72 is in condition for envelope 74 to be fabricated and sealed. Once document 72 has been positioned between first and second surfaces 130 and 132 of envelope web 120, guide 128, which is movably mounted preferably hingedly mounted to frame 22, moves away from vertex 134 of envelope web 120 so as to create an opening large enough to have the full width of vertex 134 and thickness of document 72 and web 120 pass through to sealer 38 (of which only seal pressure roller 42 is visible in FIG. 11). Once guide 128 is opened, document 72 and unsealed envelope web 120 are conveyed to sealer 38 by bi-directional tractor feeds 34, 36, 34B and 36B. Guide 128 is shown in phantom in FIG. 11 to depict one position which would allow for an opening large enough to pass document 72 and web 120. Other sizes of openings are possible. Guide 128 is in the closed position and ready to accept the advancement of a new envelope web 120, when shown in solid form.

With respect to the particulars regarding the application of force required to transfer document 72 and web 120 to the sealing device. In the embodiment shown in FIGS. 11 and 12, tractor feeds 34 and 36 run in the same direction as they do when they convey web 28 into position to form the U- or V-shaped envelope web 120 when transferring document 72 and envelope web 120 to the sealing device. However, tractor feeds 34B and 36B run in reverse of the direction that they do when they convey web 28 into position to form U- or V-shaped web 120. The effect of the forces applied by the tractor feeds to envelope web 120 is to push web 120, with document 72 cradled in vertex 134, out through the opening created when guide 128 is in the open position. The conveying means described herein, as well as others, may be adapted to produce the force required to transfer web 120 and document 72 to sealer 38.

As web 120 and document 72, which comprise envelope 74, pass through the opening created by guide 128, envelope 74 passes into sealer 38 (of which only pressure seal roller 42 is visible in FIG. 11), assisted as necessary by supplemental conveyors and/or guides such as guide 136. Sealer 38 folds envelope 74 along vertex 134, seals the remaining open sides, with or without seal heater 48, and discharges the sealed envelope into bin 138. Alternatively, envelope 74 could be deposited into other apparatus for further processing. Such processing may include further printing on the outside of the envelope, or sorting or handling multiple envelopes as they are discharged from the apparatus. Of course, such processing after the fabrication of the envelope could be combined with any of the embodiments disclosed herein.

Label printer 50, not shown in FIGS. 11 or 12, may also be incorporated into this embodiment, as well as all embodiments of the invention described herein. Label printer 50 may be positioned anywhere along the path of webs 28 or 120 so long as printer 50 can print on what will be the outside surface of envelope 74.

A suitable control system 10 for controlling the functions and sequencing of the embodiment illustrated in FIGS. 11 and 12, depending on the particular functions and systems desired may be adapted from the systems disclosed herein and from those known in the art.

Figure 13:
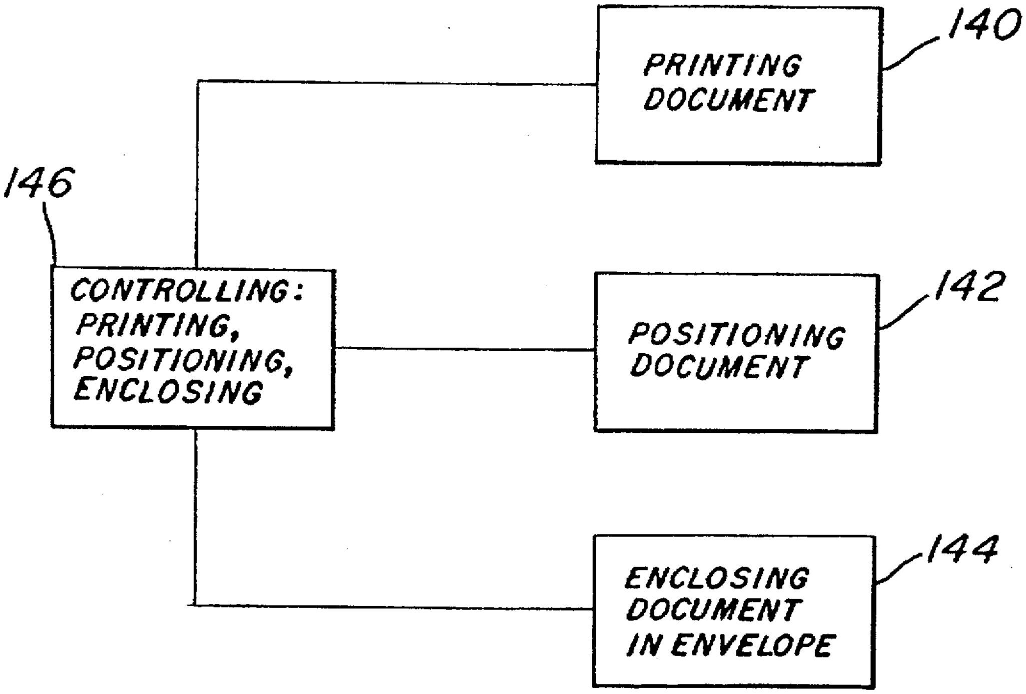
FIG. 13 is a schematic representation of the steps which comprise the method of this invention.

FIG. 13 illustrates a preferred method for maintaining the confidentiality of information contained in a printed document. In step 140, the document containing confidential information is printed. The document is then positioned in step 142 such that the document may be enclosed in an envelope after which, in step 144, the document is enclosed in an envelope in such a manner that the document may later be removed from the envelope. Printing step 140, positioning step 142 and enclosing step 144 are all subject to controlling step 146 in which the functions and sequencing of steps 140, 142 and 144 are controlled. Preferably controlling step 146 is by automatic control means. Such means may employ any digital, analog, electro-mechanical, mechanical or related automatic control means such as those described elsewhere in this specification.

Printing steps 140 may be performed by any suitable printing means, preferably an automatic printing device such as a facsimile machine, photocopier or computer printer.

Positioning step 142 may be carried out by any means so long as document 72 is positioned such that the document may be enclosed in the envelope. Positioning step 142 may employ conveyors, gravity, mechanical guides or any other material handling means for locating the document such that it may be enclosed in an envelope.

Enclosing step 144 may be performed by fabricating an envelope and sealing the envelope with the document enclosed therein. The envelope may be fabricated around the document or the document may be inserted into an envelope. The enclosing step may also include sealing the envelope, stripping envelope margins, separating the envelope from the envelope webs, and printing information on the outside of the envelope. Other portions of the enclosing step have been previously discussed in detail herein.

Figure 14:
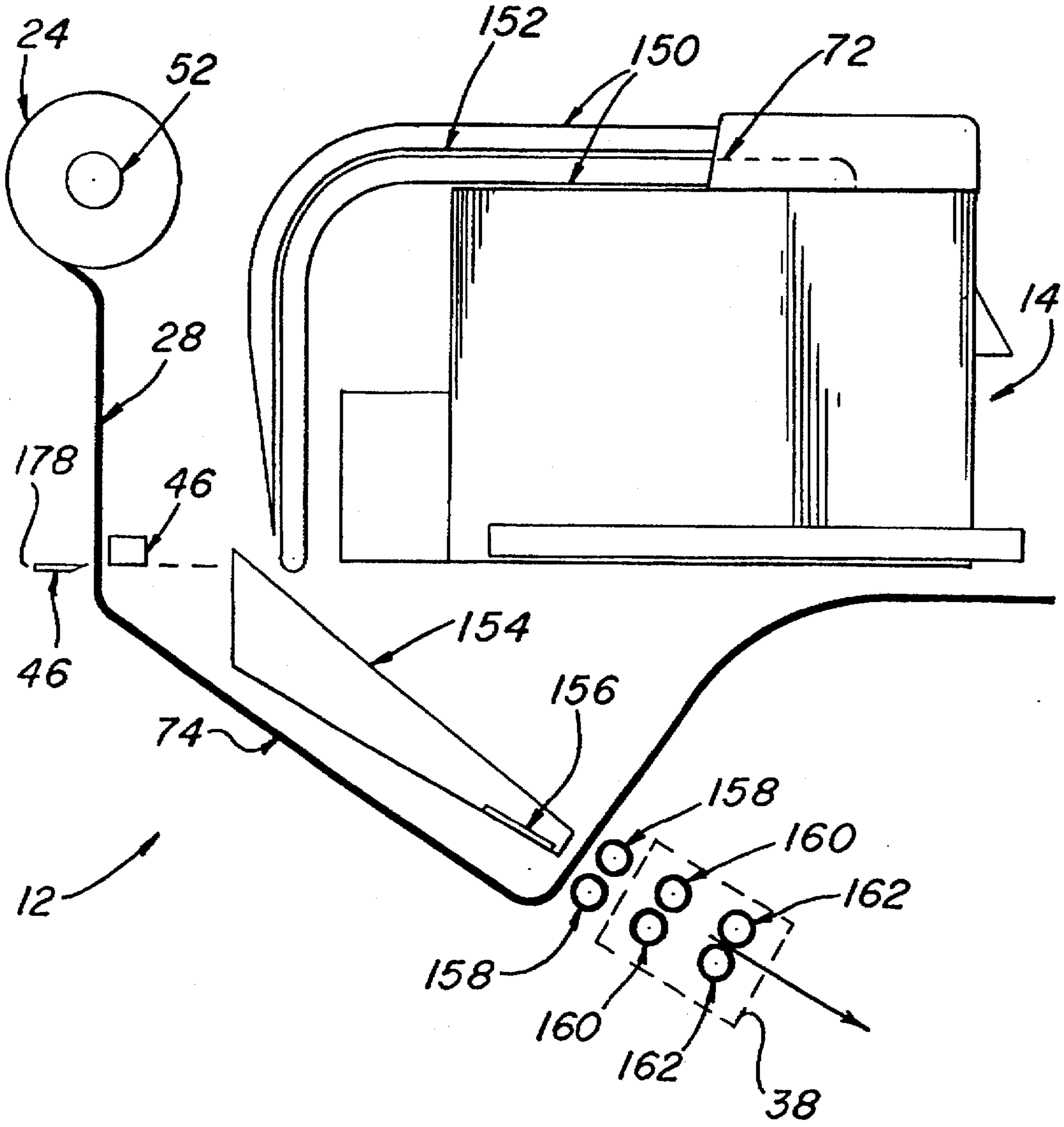
FIG. 14 is a schematic of a side view of another embodiment of this invention.
Figure 15:
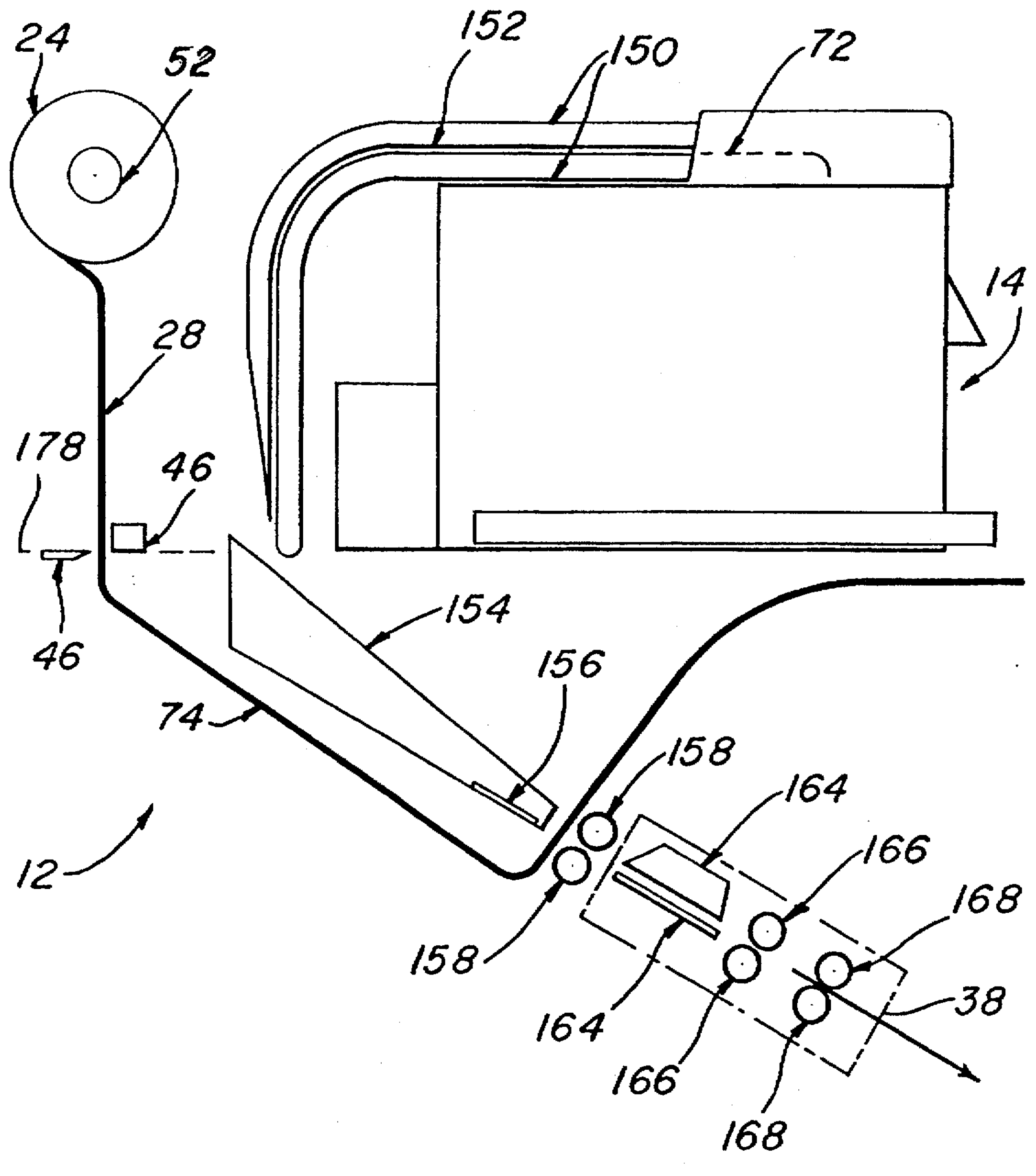
FIG. 15 is a schematic representation of a side view of another embodiment of this invention.

Turning yet to another embodiment of this invention, FIGS. 14 and 15 depict CMD 12 in a variation on the single envelope paper supply embodiment of FIG. 11. This embodiment may accommodate the document discharge of document printer 14 whether the document discharge is from the top of printer 14 (as is shown in FIGS. 14 and 15), the side or the rear.

In the case of top discharge, document paper tracks 150 which form a document paper path 152 such as the system depicted in FIGS. 14 through 18. As document pages 72 are printed off of printer 14 they are guided by document paper tracks 150 and document paper ribs 151 through document paper path 152. Each document page 72 is transported through document paper path 152 by document feed mechanism 153. In this embodiment, document paper feed mechanism 153 comprises a system of belt driven set of contact transport rollers or comealongs 155. Comealongs 155 grip each document page to transport it through document paper path 152. Each comealong has a gripping surface such as rubber or similar friction creating material on rotating wheels 148.

Once document pages 72 reach the end of document paper path 152, document page 72 is deposited into document paper guide tray 154. Tray 154 acts as an accumulator for each document page 72 until all document pages have been printed.

Document guide tray 154 is designed such that it may accommodate side and rear document discharges from printer 14. Printer 14 may be oriented such that printer 14 is mounted above paper supply 24 such that document pages 72 fall by gravity directly on to tray 154. Of course, a document conveying system such as the one employed with top discharge printers could also be adapted for use with side or end discharge printers. Tray 154 is also mounted on an angle from horizontal in order to take advantage of gravitational force when accumulating documents 72 as well as when transporting documents into envelope 74. The angle depicted in FIGS. 14 through 17 is about 45° although other angles may be suitable with this and other embodiments of the invention.

Figure 16:
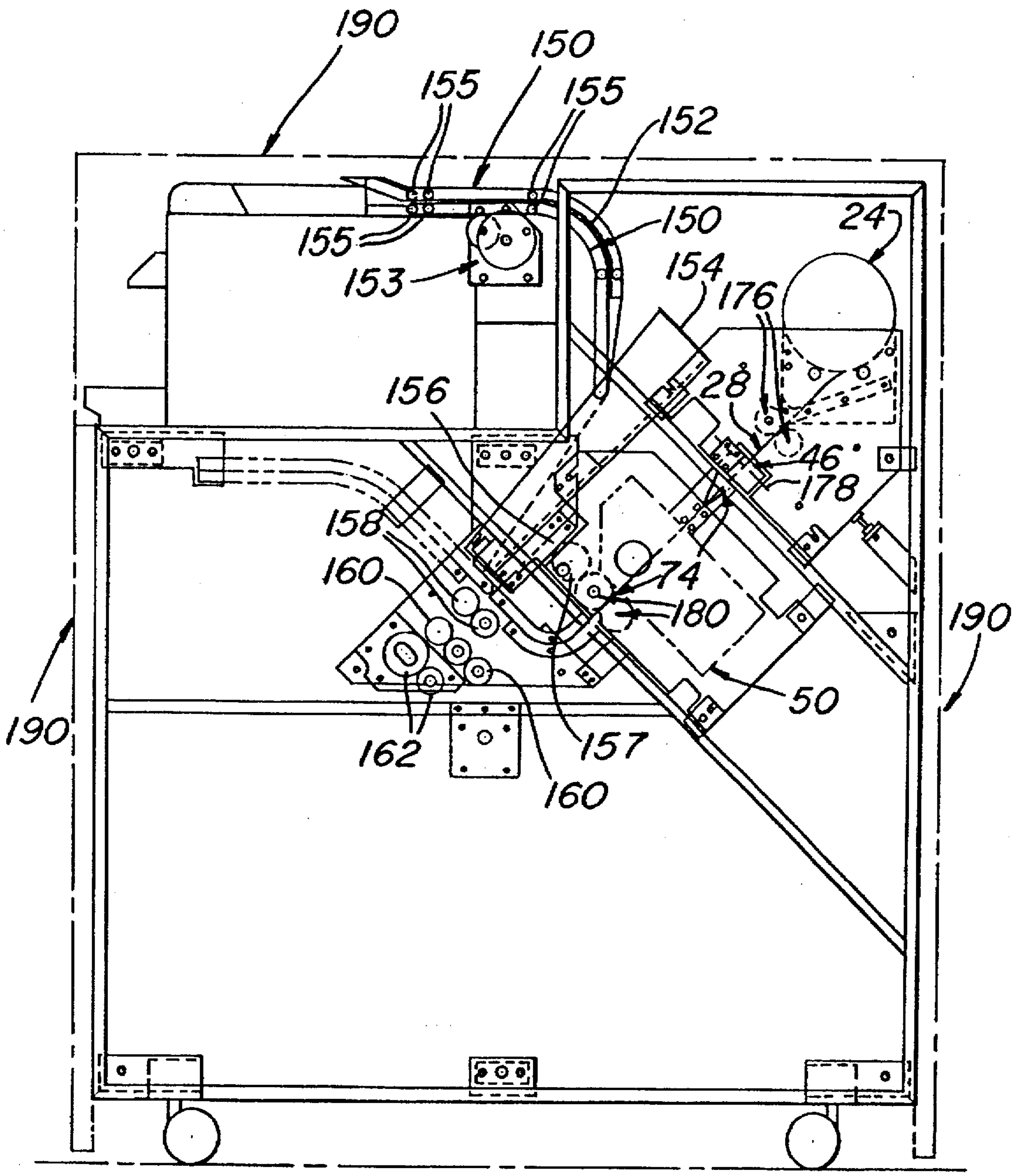
FIG. 16 is an opposite side view of the embodiment of the invention shown in FIG. 14.
Figure 17:
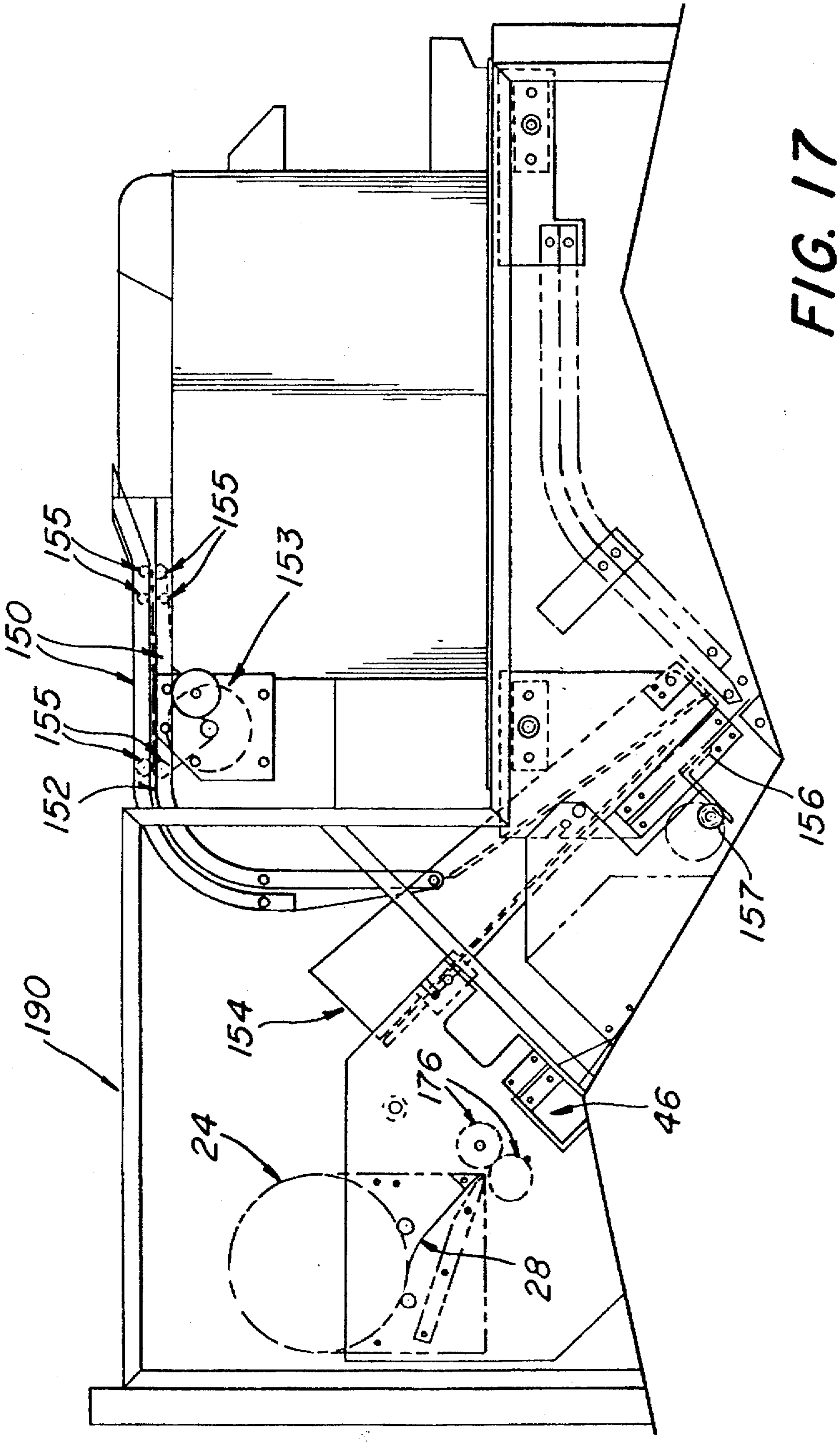
FIG. 17 is a view of the opposing side of that shown in FIG. 16 and the same side as shown in FIG. 14.
Figure 18:
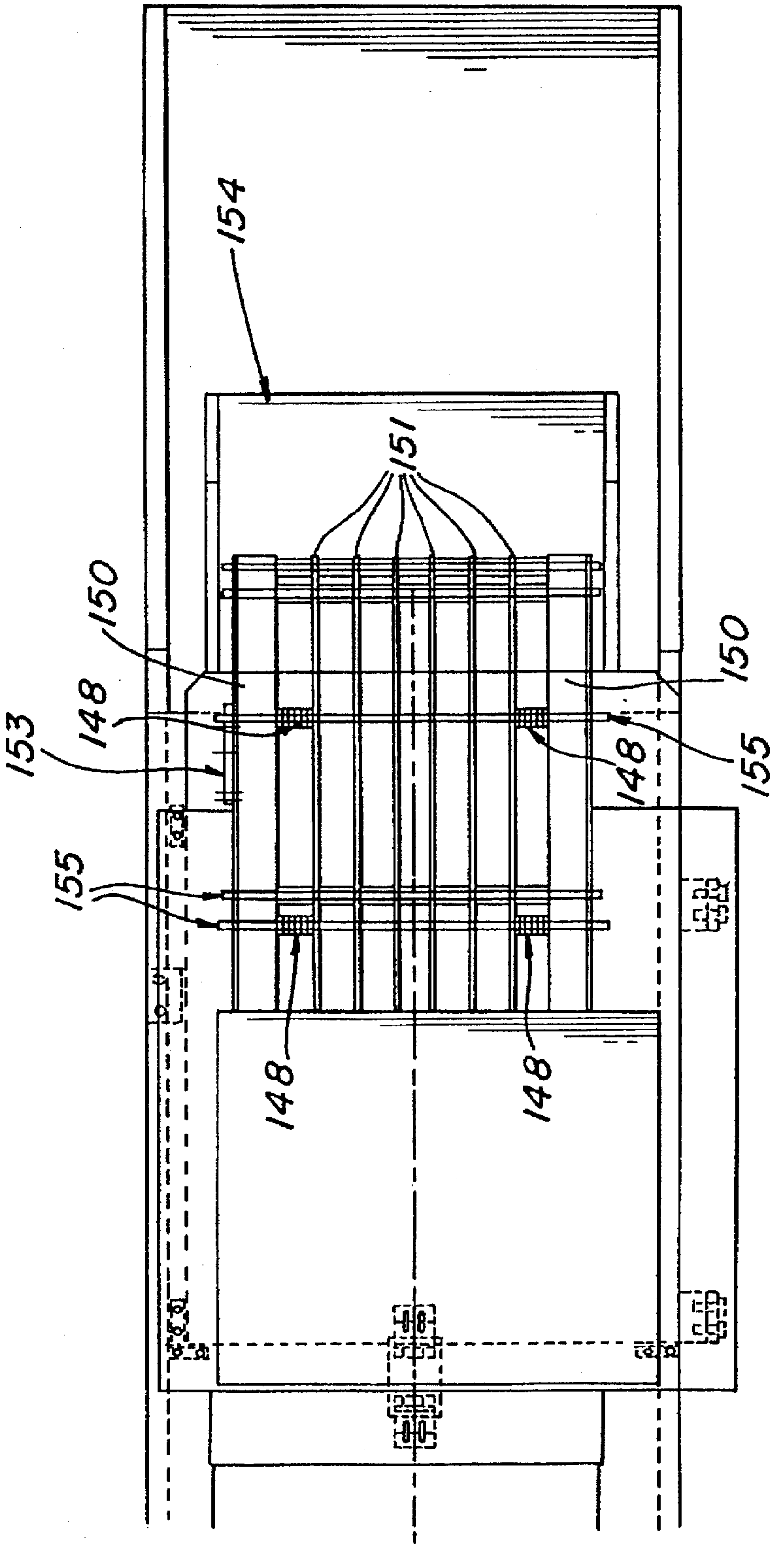
FIG. 18 is a top view of the embodiment of the invention shown in FIGS. 14, 16 and 17.

In the embodiment shown in FIGS. 14 through 18, envelope web 28 is positioned for fabrication through envelope paper path 172 formed by envelope paper tracks 170 similar to the system utilized for conveying document 72 in this embodiment. Envelope feed mechanism 173 conveys envelope web 28 from paper supply 24 through envelope paper path 172 to an appropriate length to accommodate the longest document page as described below. Envelope web 28 may be transported by envelope feed mechanism in any suitable manner such as the comealong system incorporated by document feed mechanism 153. As shown in FIGS. 16 through 18, however, envelope web 28 is advanced by envelope web rollers 176. Envelope web 28 is advanced by its appropriate length at which point the web transport ceases. Envelope 74 which is of appropriate length is then separated from envelope web 28 at cut line 178. Envelope 74 is then conveyed as an envelope web segment by envelope transport rollers 180 which positions envelope 74 for fabrication of the envelope.

Document paper guide tray 154 is also equipped with document insertion blade 156 which assists in both forming envelope 74 and enclosing document 72 into envelope 74. In the embodiment shown in FIGS. 14 through 18, blade 156 extends outwardly from tray 154 so as to contact and form a vertex in envelope web 74 by slightly buckling envelope web 74 into a U- or V-shape and which vertex forms the bottom or leading edge of the envelope as it engages envelope folding rollers 158. Blade 165 also positively positions document 72 in the vertex of envelope 74. The stroke or distance which blade 156 travels is about an inch although the stroke distance need only be as long as it takes to have the leading edge of envelope 74 engage envelope folding roller 158. Blade 156 may be actuated by cam 157 or any suitable linear transfer device such as a pneumatic or hydraulic piston. Once envelope 74 engages rollers 158, rollers 158 fold the leading edge of envelope 74 and transport both envelope 74 and document 72 to envelope sealer mechanism 38.

Envelope seal mechanism 38 seals the three open edges of envelope 74 and, optionally, encloses or knurls the seal in order to detect tampering with the envelope seals as described herein. FIGS. 14 and 15 discloses different envelope seal mechanisms 38. FIGS. 16 and 17 deposit details of the heat seal mechanism embodiment of FIG. 14.

In each of FIGS. 14 and 15, broken line box 38 encloses the components of heat seal mechanism 38. FIG. 14 (as well as FIGS. 16 and 17 details) depict a series of two sets of rollers 160 and 162. Rollers 160 deposit side and end seal pressure rollers similar in function to those of FIGS. 5, 6 and 7. Optionally, these rollers may be heated by nichrome heating elements embedded in each roller as described herein. Also optionally, rollers 160 may be embossed or knurled such that the seals are embossed or knurled during the sealing function. Once each side and end seal is pressure sealed, envelope 74 is transported forward by rollers 158 to retractable heat roll assembly 162. The seals are heated to about 160° F. under pressure and the completed sealed envelope 74 exits the apparatus. Of course, the several mechanisms described herein may be utilized with this and the embodiment to follow either in part or in whole.

FIG. 15 depicts heater 164, preferably a halogen heater such as G.E. Halogen model GEQ 500T 3/CL, end seal rollers 166, which may also be optionally embossed, and side seal rollers 168, which also may be optionally embossed. Envelope 74 is transported by rollers 158 under hater 164 which is preferably heated to about 160° F. Envelope 74 then passes to rollers 166 for end sealing and then to rollers 168 for side sealing and the completed sealed envelope 74 exits the apparatus. Of course, the seals may be simultaneously embossed during the sealing process as described herein.

Figure 19:
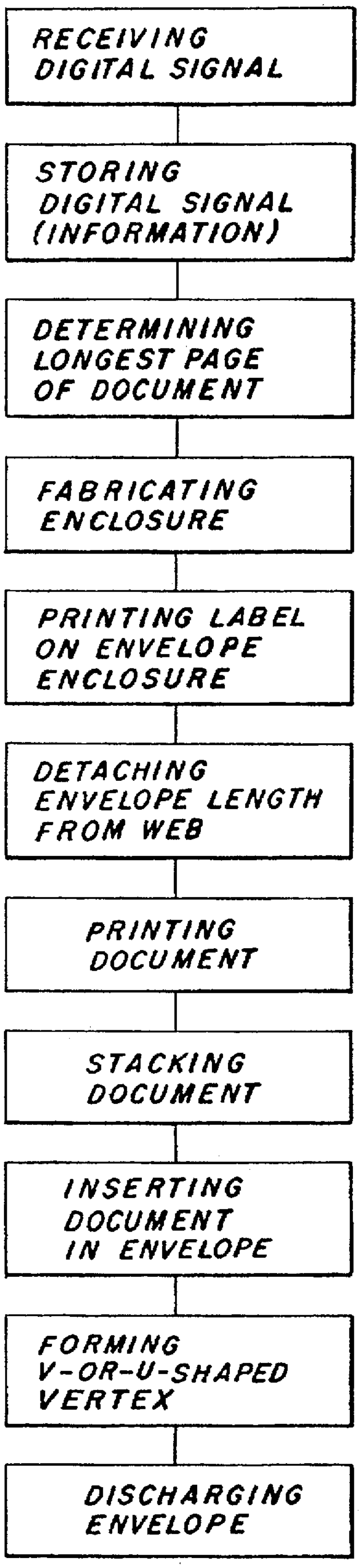
FIG. 19 is a schematic representation of the steps which comprise the method of the embodiment shown in FIGS. 14, 16, 17 and 18.

FIG. 19 discloses a method of the invention disclosed in the embodiment depicted in FIGS. 14 through 18. The steps of the invention include: receiving a digital signal which comprises the information contained in a document; storing the information received; determining the longest page in the document; fabricating an enclosure or envelope to accommodate the physical length of the longest page (e.g. 11", 14", A4, etc. length papers) which fabricating steps may also include the steps of positioning the envelope paper web 28 such that the envelope will be fabricated to the appropriate length, printing desired information on the outside surface of the envelope with label printer 50, detaching the appropriate length of envelope paper in envelope web segment 74 from envelope web 28; printing document 72; stacking each page of document 72 such that it is positioned in guide tray 154; inserting document 72 into envelope 74 as envelope 74 is being fabricated; folding to form a vertex of envelope 74; sealing envelope 74; discharging envelope 74. This method is accomplished by fabricating the envelope after the data signal is received and/or during the time the data signal is being received. This illustrates the "real time" operation of this invention.

Another feature of this invention is illustrative of the invention's versatility. Referring to FIG. 8, which depicts a block diagram of a control system utilized in one embodiment of the invention, the printer comprises a facsimile machine. A signal, external to the invention, is received over a telephone line. The signal is processed through facsimile receive circuit 82 and sent to micro computer 80. The signal may then be stored and manipulated for various purposes. For example, data received may be rearranged and sent to document printer control circuit 84 in such form that the pages of the facsimile will print out in reverse sequential order (i.e. last page first through first page last). This printing method will assure that multiple page facsimiles will be arranged in ascending page order with the first page on top and last page on the bottom. This feature of the invention will eliminate the need for mechanical sorting devices and the inconvenience of manual sorting. Moreover, confidentiality of the content of the document will not be compromised by having persons other than the document's intended recipient rearrange the document in the order it was intended to be viewed.

Information received by the micro computer may also be utilized for extracting certain data from the document for the purposes of labeling the outside of the envelope. The intended recipient's name, address, or other pertinent information, may be extracted from the incoming data without revealing the remaining information which may be confidential in nature. One manner of extracting such information is to place "public" information, such as the recipient's name and address, in a particular location or field, such as the inside address of a letter. Micro computer 80 is instructed through programming to read a particular field, extract the information in that field and send it to the label printer circuit. Once the field is read, the "public" information is then sent from the micro computer to label printer control circuit 86 for printing by label printer. Similar uses for such features may also be exploited when the printer is a photocopier or computer printer.

The present invention may be embodied in other specific forms without departing from the spirit or essential attributes of the invention, and accordingly, reference should be made to the appended claims rather than the foregoing specification as indicating the scope of the invention.

What is claimed is:

1. An apparatus for maintaining the confidentiality of information contained in a printed document by fabricating an envelope around said document wherein said information is sent by a sending party to an intended recipient, said apparatus comprising:

a machine frame;

a document printer adjacent to said machine frame wherein said printer receives and stores said information and prints said document, wherein said document may comprise either a single page or a plurality of separate pages of varying lengths and informational content;

a document feed chute, mounted to said machine frame and adjacent to said printer, on which each page of said document is deposited, said feed chute being angled such that each page of said document may slide by gravitational force, in a plane which defines a machine direction plane, from said chute to a point at which a first envelope paper web meets a second envelope paper web and such that said information cannot be viewed;

upper envelope supply roller, around which a supply of upper envelope paper for said first envelope web is wound, wherein said upper envelope supply roller is rotatably mounted to said frame;

lower envelope supply roller, around which a supply of lower envelope paper for said second envelope web is wound, wherein said lower envelope supply roller is rotatably mounted to said frame;

right and left tractor feeds mounted to said frame each tractor feed having a series of pins, spaced at the same intervals as said margin holes such that said pins slideably engage said holes of said tractor feed's respective margin such that said envelope paper webs move in the direction in which said pins move;

a seal pressure roller mechanism mounted to said frame comprising a seal pressure frame; left and right margin pressure rollers rotatably and adjustably mounted to said seal pressure frame; center roller actuator adjustably mounted to said seal pressure frame; center roller frame adjustably mounted to said center roller actuator; said center pressure roller rotatably and adjustably mounted to said center roller frame;

a paper cutter, positioned to detach said envelope from said first and second webs, said cutter comprising a cutting mechanism frame mounted to said frame; a paper cutter actuator adjustably mounted to said paper cutter frame; and a paper cutter blade mounted to said paper cutter actuator;

a control system adapted to control said printer's functions and sequencing, said tractor feed's functions and sequencing, said seal pressure roller functions and sequencing, and said paper cutter's functions and sequencing such that said information cannot be viewed.

2. The apparatus of claim 1 further comprising a label printer mounted to said frame wherein said label printer prints desired information on said outside surface of the envelope and said control system is further adapted to control said label printer's functions and sequencing.

3. The apparatus of claim 1 further comprising a seal heater mounted to said frame wherein said control system is further adapted to control said seal heater's function and sequencing.

4. The apparatus of claim 1 further comprising right and left margin debris tractor feeds mounted to said frame each having a series of pins spaced at intervals the same as said margin holes such that said pins slideably engage said margin holes, each debris tractor feed being positioned on an angle away from the center of said first and second webs, wherein said angle is sufficient to separate said margins from said webs without distorting or tearing said envelope paper webs and wherein said control system further controls the functions and sequencing of said debris tractor feeds.

5. The apparatus of claim 3 further comprising left and right margin separation blades, each margin blade having a cutting surface wherein each margin blade is mounted to said frame such that said cutting surfaces assist in the separation of said margins from said first and second webs.

6. An apparatus for maintaining the confidentiality of information contained in a printed document wherein said information is sent by a sending party to an intended recipient, said apparatus comprising:

means for sending said information from said sending party to said recipient, wherein said information is sent in a first signal;

means for receiving said first signal;

means for storing said first signal;

means for printing said information from said first signal on said document such that said printed information cannot be viewed, wherein said document comprises one or more pages;

means for positioning each page of said document as said page is printed by and discharged from said printing means such that said printed information cannot be viewed and such that said document may be enclosed in an envelope, and wherein said positioning means further comprises means for positioning said document between first and second envelope paper webs, and means for depositing each page of said document on a feed chute as said page is printed by and discharged from said printing means, said chute having sufficient angle such that each page of said document slides down said chute and on to said second envelope paper web by gravitational force, said document stopping where said second envelope paper web comes essentially in contact with said first envelope paper web;

means for enclosing said document in said envelope such that said information cannot be viewed and such that said document may later be removed from said envelope by said intended recipient and wherein said enclosing means further comprises means for fabricating said envelope such that said information cannot be viewed, means for separating said envelope from said first and second envelope paper webs, wherein said separating means comprises means for cutting through said first and second envelope paper webs, means for printing information on said envelope, and wherein said fabricating means further comprises means for sealing said first and second envelope paper webs together to form an envelope around said document, and wherein said sealing means further comprises means for applying adhesive to said first or second envelope paper webs, means for applying pressure to said first and second envelope paper webs, wherein said pressure is applied by seal pressure rollers and means for heating said adhesive; and means for controlling said receiving, storing, printing, positioning, and enclosing means.

7. The apparatus of claim 6, wherein said first and second envelope paper webs having right and left margins, said margins having spaced holes therethrough and being detachably connected to opposite sides of each web, further comprising means for separating said margins from said envelope paper webs.

8. The apparatus of claim 7, wherein said margin separating means further comprises means for applying a force to said detachable connection sufficient to cause said margin to detach from said envelope paper webs without tearing said envelope paper webs.

9. The apparatus of claim 7, wherein said margin separating means further comprises means for cutting said detachable connection prior to, or simultaneously with, the application of said force.

10. The apparatus of claim 8, wherein said document printing means comprises a facsimile machine, a photocopier, or a computer printer.

11. A method for maintaining the confidentiality of information contained in a printed document wherein said information is sent by a sending party to an intended recipient, said method comprising the steps of:

sending said information from said sending party to said recipient, wherein said information is sent in a first signal;

receiving said first signal;

storing said first signal;

printing by printing means said information from said first signal on said document, wherein said document comprises one or more pages, such that said printed information cannot be viewed;

positioning each page of said document as said page is printed by and discharged from said printing means such that said document may be enclosed in an envelope and such that said printed information cannot be viewed, positioning said document between first and second envelope paper webs, and depositing each page of said document on a feed chute as said page is printed by and discharged from said printing means, said chute having sufficient angle such that each page of said document slides down said chute and on to said second envelope paper web by gravitational force, said document stopping where said second envelope paper web comes essentially in contact with said first envelope paper web such that said information cannot be viewed;

enclosing said document in said envelope such that said information cannot be viewed and that said document may later be removed from said envelope by said intended recipient, fabricating said envelope such that said information cannot be viewed, separating said envelope from said first and second envelope paper webs such that said information cannot be viewed by cutting through said first and second envelope paper webs, printing information identifying said intended recipient on said envelope, sealing said first and second envelope paper webs together to form an envelope around said document by applying adhesive to said first or second envelope paper webs and applying pressure to said first and second envelope paper webs by seal pressure rollers, heating said adhesive; and controlling said receiving, storing, printing, positioning, and enclosing steps.

12. The method of claim 11, said first and second envelope paper webs having right and left margins, said margins having spaced holes therethrough and being detachably connected to opposite sides of each web, further comprising the step of separating said margins from said envelope paper webs.

13. The method of claim 12, wherein said margin separating step further comprises the step of applying a force to said detachable connection sufficient to cause said margin to detach from said envelope paper webs without tearing said envelope paper webs.

14. The method of claim 13, wherein said margin separating step further comprises the step of cutting said detachable connection prior to, or simultaneously with, the application of said force.

15. The method of claim 14, wherein said document printing is performed by a facsimile machine, photocopier or computer printer such that said information cannot be viewed.

16. An apparatus for maintaining the confidentiality of information contained in a printed document wherein said information is sent by a sending party to an intended recipient, said apparatus comprising:

means for sending said information from said sending party to said recipient, wherein said information is sent in a first signal;

means for receiving said first signal;

means for storing said first input signal;

means for printing said information from said first signal on said document such that said printed information cannot be viewed, wherein said document comprises one or more pages;

means for positioning each page of said document as said page is printed by and discharged from said printing means such that said printed information cannot be viewed and such that said document may be enclosed in an envelope, said positioning means further comprising means for depositing each page of said document on a feed chute as said page is printed by and discharged from said printing means, said chute having sufficient angle such that each page of said document slides down said chute and on to a second envelope paper web by gravitational force, said document stopping where said second envelope paper web comes essentially in contact with a first envelope paper web;

means for enclosing said document in said envelope such that said information cannot be viewed and such that said document may later be removed from said envelope by said intended recipient; and means for controlling said receiving, storing, printing, positioning, and enclosing means.

17. A method for maintaining the confidentiality of information contained in a printed document wherein said information is sent by a sending party to an intended recipient, said method comprising the steps of:

sending said information from said sending party to said recipient, wherein said information is sent in a first signal;

receiving said first signal;

storing said first signal;

printing by printing means said information from said first signal on said document, wherein said document comprises one or more pages, such that said printed information cannot be viewed;

positioning each page of said document as said page is printed by and discharged from said printing means such that said document may be enclosed in an envelope and such that said printed information cannot be viewed, said positioning step further comprising the step of depositing each page of said document on a feed chute as said page is printed by and discharged from said printing means, said chute having sufficient angle such that each page of said document slides down said chute and on to a second envelope paper web by gravitational force, said document stopping where said second envelope paper web comes essentially in contact with a first envelope paper web;

enclosing said document in said envelope such that said information cannot be viewed and that said document may later be removed from said envelope by said intended recipient; and controlling said receiving, storing, printing, positioning, and enclosing steps.

* * * * *